(12) United States Patent
Her

(10) Patent No.: US 8,294,982 B2
(45) Date of Patent: Oct. 23, 2012

(54) APPARATUSES AND METHODS FOR PERFORMING GAIN GUIDING

(75) Inventor: Tsinghua Her, Charlotte, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 344 days.

(21) Appl. No.: 12/832,583

(22) Filed: Jul. 8, 2010

(65) Prior Publication Data

US 2011/0149382 A1 Jun. 23, 2011

Related U.S. Application Data

(63) Continuation of application No. PCT/US2008/085565, filed on Dec. 4, 2008.

(60) Provisional application No. 61/019,680, filed on Jan. 8, 2008, provisional application No. 61/263,858, filed on Nov. 24, 2009.

(51) Int. Cl.
*H01S 3/00* (2006.01)
(52) U.S. Cl. ............... 359/341.1; 372/6; 385/123
(58) Field of Classification Search ...... 372/6; 385/123; 359/341.1
See application file for complete search history.

(56) References Cited

U.S. PATENT DOCUMENTS

| | | | |
|---|---|---|---|
| 6,751,388 B2 | 6/2004 | Siegman | |
| 7,187,832 B2 | 3/2007 | Lidorikis et al. | |
| 7,286,575 B2 | 10/2007 | Payne et al. | |
| 7,340,140 B1 | 3/2008 | Xu et al. | |
| 7,881,347 B2 * | 2/2011 | McComb et al. | ................ 372/6 |
| 2002/0061176 A1 | 5/2002 | Libori et al. | |
| 2005/0105867 A1 | 5/2005 | Koch et al. | |
| 2006/0098694 A1 | 5/2006 | Hongo | |
| 2006/0133431 A1 | 6/2006 | Payne et al. | |
| 2007/0189351 A1 | 8/2007 | Rice et al. | |

FOREIGN PATENT DOCUMENTS

WO      WO 02/088797 A      11/2002

OTHER PUBLICATIONS

Ao, X. et al., *Gain-Guiding in Large-Core Bragg Fibers*, Optical Express vol. 17, No. 25, (2009), pp. 22666-22672.
Blaize, S. et al., *Multiwavelengths DFB Waveguide Laser Arrays in Yb-Er Codoped Phosphate Glass Substrate*, IEEE *Photonics Technology Letters.*, vol. 15, No. 4, (2003), pp. 516-518.

(Continued)

*Primary Examiner* — Mark Hellner
(74) *Attorney, Agent, or Firm* — Alston & Bird LLP

(57) ABSTRACT

A fiber, such as a photonic bandgap fiber, is provided, the fiber including a core and a cladding. The core can extend longitudinally and can have a gain medium configured to provide laser amplification to laser radiation propagating along the core. For example, the gain medium may include a dopant configured to provide amplification, when activated by one or more modes of excitation radiation, of laser radiation propagating along said core. The cladding can be radially exterior to the core, and can be configured to provide a low-loss propagation the one or more modes of excitation radiation and a lossy propagation of all modes of laser radiation along the core, the lossy propagation higher than the low-loss propagation, in particular when the one or more modes of excitation radiation is substantially absent from the core. Associated methods and apparatuses are also provided.

21 Claims, 22 Drawing Sheets

OTHER PUBLICATIONS

Boumans, G. et al., *Properties of a Hollow-Core Photonic Bandgap Fiber at 850 nm Wavelength*, Optics Express, vol. 11(14), (2003), pp. 1613-1620.

Folkenberg, J. R. et al., *Polarization Maintaining Large Mode Area Photonic Crystal Fiber*, Optics Express, vol. 12, (2004), pp. 956-960.

Hart, S. D. et al., *External Reflection From Omnidirectional Dielectric Mirror Fibers*, Science, vol. 296(5567), (2002), pp. 510-513.

Limpert et al., *High-Power Rod-Type Photonic Crystal Fiber Laser*, Optics Express 13(4) (2005), pp. 1055-1058.

Lu, C. et al., *High Refractive Index Thin Films of ZnS/polythiourethane Nanocomposites*, Journal of Materials Chemistry, vol. 13, (2003), pp. 526-530.

Ortigosa-Blanch, A. et al., *Highly Birefringent Photonic Crystal Fibers*, Opt. Lett., vol. 25, No. 18, (2000), pp. 1325-1327.

Siegman, A. E., *Propagating Modes in Gain-Guided Optical Fibers*, Journal of the Optical Society of America A, vol. 20, No. 8 (2003), pp. 1617-1628.

Siegman, A. E., *Gain-Guided, Index-Antiguided Fiber Lasers*, Journal of the Optical Society of America B, vol. 24, No. 8, (2007), pp. 1677-1682.

Temelkuran, B. et al., *Wavelength-Scalable Hollow Optical Fibres With large Photonic Bandgaps for CO2 Laser Transmission*, Nature, vol. 420, (2002), pp. 650-653.

Vienne, G. et al., *Ultra-Large Bandwidth Hollow-Core Guiding in All-Silica Bragg Fibers With Nano-Supports*, Optics Express, vol. 12(15), (2004), pp. 3500-3508.

International Search Report for Application No. PCT/US2008/085565 dated Jun. 12, 2009.

\* cited by examiner

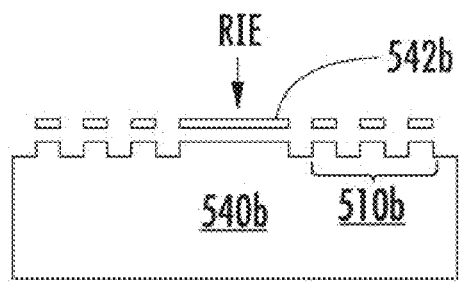
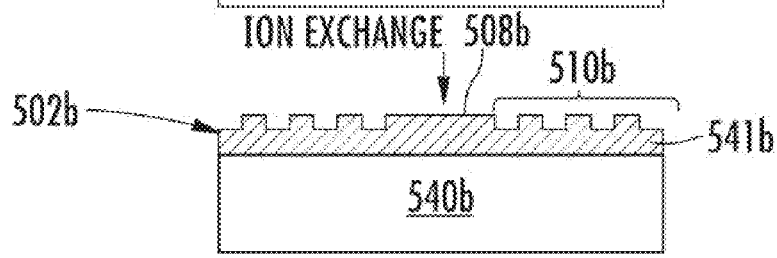
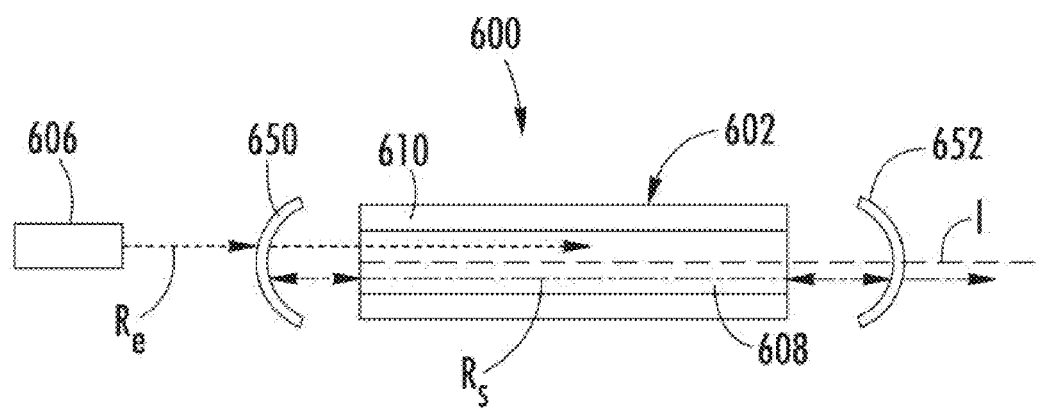

APPARATUSES AND METHODS FOR PERFORMING GAIN GUIDING

CROSS-REFERENCE TO RELATED APPLICATIONS

This application is a continuation of International Application No. PCT/US2008/085565, filed on Dec. 4, 2008, which claims the benefit of U.S. Provisional Patent Application No. 61/019,680 filed Jan. 8, 2008, and U.S. Provisional Patent Application No. 61/263,858, filed Nov. 24, 2009, all of which are incorporated by reference herein in their entirety.

FEDERALLY SPONSORED RESEARCH OR DEVELOPMENT

This invention was made with United States Government support under Grant No. W911NF-05-1-0517 awarded by the U.S. Army Research Office, and under Grant No. HR0011-08-1-0065 awarded by the Defense Advanced Research Projects Agency, and under Grant No. 0925992 awarded by the National Science Foundation. The United States Government may have certain rights in the invention.

BACKGROUND

Embodiments of the present invention relate to gain guiding and index antiguiding of laser radiation in a waveguide, and more particularly, to apparatuses and method for performing gain guiding and index antiguiding of laser radiation in a microstructured waveguide.

High-power waveguide lasers and amplifiers can enable a broad spectrum of military and civilian applications. These include Light Detection And Ranging (LIDAR) for ranging, tracking and target identification; obstacle avoidance systems for unmanned vehicles; improved free-space laser communications (ground-to-air, air-to-air, and inter-satellite); coherent laser radar for wind metrology and vibrometry; pump sources for nonlinear frequency down-conversion for counter-measures; clear-air turbulence analysis; bio-chemical detection and pollution monitoring; and high power laser weaponry. Among various platforms of high-power sources, fiber lasers are particularly attractive due to their light weight, high conversion efficiency, ease of thermal management, and near diffraction-limit beam quality. In addition, optical fiber material is compatible with a variety of doped ions, offering a wide range of choice of photon energy depending upon a specific application.

Conventional waveguides and fibers comprise a core surrounded by a cladding. The core has an index of refraction higher than that of the cladding, i.e., a positive index step, such that light can be trapped inside the core by total internal reflection. This is referred to as "index guiding." The shape, dimension and the index step determine the modal characteristics of guided modes, including field distribution, polarization, and dispersion.

In many applications, single mode operation is highly desired. The fundamental mode in fibers has the least diffraction in free space to maintain small focus over a longer distance. Its simple field pattern facilitates coherent beam combining of multiple apertures. However, to achieve single-mode operation requires a combination of small index step and/or a small core diameter, which limits the modal area and therefore output power of the fiber laser. For example, conventional step-index fiber has a maximum diameter of only around 15 µm in order to remain single-mode.

To maximize the obtainable power, both high output power from a single aperture and coherent beam combining of multiple apertures are desirable. Power scaling of single fiber lasers is limited by optical damage of the host materials and optical nonlinearity. The latter includes stimulated Brillouin scattering (SBS), stimulated Raman scattering (SRS), and self-phase modulation (SPM), all of which convert laser radiation to other photon energy. These linear and non-linear impairments depend on laser intensity, which call for novel fiber design with large modal area (LMA) to reduce peak intensity while attaining high output power. Single-mode operation and LMA are also critical for coherent beam combining since the former allows for simple and predictable interference pattern at the far field and the latter suppress SBS and SRS, which impose noise-like wide band modulation on the amplified beam to degrade constructive interference.

Power threshold of stimulated Brillouin scattering and stimulated Raman scattering is inversely proportional to the fiber length. Higher threshold of these impairments calls for a shorter device length. To obtain high power over a short distance requires a large spatial overlap between the pump and laser radiation to provide a high gain. See, e.g., Limpert et al., "High-power rod-type photonic crystal fiber laser," Optics Express 13(4), 2005, pp. 1055-1058.

Efficient coupling of pump radiation into fibers is also required to obtain high power. Conventionally this is done by "cladding-pumped," meaning that the fiber has a core surrounded by an inner cladding layer, which is then surrounded by an outer cladding layer. FIGS. 1 and 2 are representative of a cladding-pumped fiber, showing the fiber 10 having a core 12 surrounded by an inner cladding layer 14 that is then surrounded by an outer cladding layer 16. The core 12 and inner and outer cladding 14, 16 have respective indices of refraction $n_c$, $n_{ic}$, $n_{oc}$ and are chosen such that $n_c > n_{ic} > n_{oc}$. This causes signal or laser radiation propagating through the core 12 to be confined in the core, and pump radiation to be confined by the inner cladding 14 via total internal reflection. In particular, the inner cladding can be much larger than the core in size and have much larger refractive index than the outer cladding. Both large size and large numerical aperture substantially facilitates pump coupling.

A single-mode LMA fiber laser based upon gain guiding in a large-core index-antiguided fiber is the subject of the disclosure in U.S. Pat. No. 6,751,388 to Siegman ("the '388 patent"). In index antiguided fibers, the core has a refractive index lower than the cladding such that all propagating modes therein are leaky. The lowest-order mode (i.e., the fundamental mode) has the lowest propagating loss, with increasing propagation loss for increasing higher-order modes. A suitable gain is provided by optical excitation of the dopant in the core to amplify laser radiation such that only the fundamental mode has net gain and becomes amplified while all other higher-order modes remain lossy and therefore decay during propagation. Theory shows that the threshold of gain guiding of the first higher-order mode in a step-index index antiguided ("IAG") fiber is 2.54 times higher than that of the fundamental mode, which is very promising for strong transverse mode discrimination during gain guiding. Large IAG is shown critical to the realization of gain guiding ("GG") by substantially reducing the threshold for gain guiding, thus making GG more practical in terms of fabrication and pumping requirements. General teachings on gain guiding in step-index fibers can be found in Siegman, "Propagating modes in gain-guided optical fibers," Journal of the Optical Society of America A, Vol. 20, 2003, pp. 1617-1628 and "Gain-guided, index-antiguided fiber lasers," Journal of the Optical Society of America B, Vol. 24, 2007, pp. 1677-1682.

Lasing in gain-guided index-antiguided fibers has been demonstrated in a flash lamp-pumped Nd$^+$-doped phosphate fiber with core diameter up to 400 μm. From these experiments it was found that larger index antiguide is desired to reduce the gain to realize gain guiding. It has subsequently been found that index antiguiding also takes place for pump radiation, and unlike laser radiation where gain can compensate for its loss and confine its propagation, there is no gain for pump radiation which remains leaky and diffracts all its power during propagation.

Photonic crystal fibers are fibers in which the core is surrounded by photonic crystal structures, which may include, for example, a periodic array of holes having spacing on the order of light wavelength. A photonic crystal structure has a range of frequencies and propagation constants, known as "photonic bandgap," over which propagation modes cannot be supported. Light propagates inside the core that falls within the photonic bandgap of the cladding will be trapped inside the core to form a confined mode. Single-mode operation can be obtained by proper choice of the frequency, the structure of the core, and the structure of photonic crystal cladding. Since this guidance mechanism does not rely on index guiding, light can be guided in a core where its index is lower than the average refractive index of the surrounding cladding.

The use of hollow-core photonic crystal fibers as high-power fiber laser sources can be found in U.S. Pat. Publ. No. 2005/0105867 to Koch et al. Laser radiation resides in the stopband of a photonic crystal cladding adjacent to the core, and pump radiation resides in the stopband of another photonic crystal cladding surrounding the inner photonic crystal cladding. Suppression of SBS is mainly achieved by the hollow core where a large fraction of mode energy is present. The method, however, yields small mode size since it is determined by the photonic bandgap guidance. Furthermore, amplification of the fundamental mode only takes place in the peripheral of the mode where the pump and laser radiation overlap and is not very efficient.

A fiber laser having a large core diameter that propagates only the fundamental mode with high gain to produce high power output has not yet been solved in the art. There remains a need in the art for a fiber laser with a large core diameter that only operates in fundamental mode and possesses enough gain to yield high power output.

BRIEF SUMMARY

In one aspect, a fiber is provided that includes a core and a cladding. The core can extend longitudinally and can have a gain medium configured to provide amplification of laser radiation propagating substantially longitudinally along the core. For example, the gain medium may include a dopant configured to provide amplification, when activated by one or more modes of excitation radiation, of the laser radiation propagating along the core. The cladding is exterior to the core, and can be configured to provide a low-loss propagation of at least some excitation radiation along the core and generally has a lossy propagation of all modes of laser radiation particularly when the at least some excitation radiation is substantially absent from the core such as with respect to the operation of a passive fiber.

In one embodiment, the core is cylindrical and the cladding radially surrounds the core. In another embodiment, the core is generally planar and the cladding is disposed on opposing transverse sides of said core.

In an embodiment of the invention, the cladding of the fiber is configured to provide a reduced propagation loss for a lowest-order mode of laser radiation propagating along the core relative to a propagation loss for one or more high-order modes of laser radiation propagating along the core. The gain medium may be configured, such as, for example, through doping, to amplify the lowest-order mode of laser to at least compensate for this reduced propagation loss. In another embodiment, the gain medium is configured such that it is insufficient to compensate for the propagation loss of the higher-order modes of laser radiation.

In yet another embodiment of the invention, the cladding is configured to substantially confine within the core a plurality of modes of excitation radiation.

In an embodiment of the invention, the cladding has a photonic bandgap region that is configured to have at least one stopband and at least one passband. For example, the core light may pass through one or more stopbands and one or more passbands of the photonic bandgap region. The at least one stopband prevents the at least one mode of excitation radiation from substantially passing through the photonic bandgap region. In certain embodiments of the invention, particularly in the absence of amplification or gain, the at least one passband allows the all modes of laser radiation to substantially pass through the photonic bandgap region.

In one embodiment of the invention, the photonic bandgap region includes an array of longitudinal holes, rods, and/or a series of layers stacked transverse to said core and having alternating respective indices of refraction. In another embodiment, the photonic bandgap region may comprise one or more layered pairs, a layered pair defined by a first layer having a first refractive index and the a second layer having a second refractive index, the first refractive index not being equal to the second refractive index. Indeed, the one or more layered pairs may be itself comprised of combinations of layered pairs having varying configurations of refractive indexes.

In another aspect, an apparatus is provided that includes a fiber having a core and a cladding. The core can extend longitudinally and can have a gain medium configured to provide laser amplification to laser radiation propagating along the core. The cladding may be exterior to the core and configured such that at least some excitation radiation experience a low-loss propagation along the core. The cladding may also be configured such that all modes of laser radiation experience a lossy propagation along the core, which is higher that the low-loss propagation of the low-loss propagating excitation radiation, particularly when the at least some excitation radiation is substantially absent from the core such as with respect to the operation of a passive fiber. An excitation radiation source configured to emit a light, the light coupled to the at least one mode of excitation radiation absorbed by the gain medium when propagating through the core.

In another embodiment of the invention, the apparatus additionally comprises a laser radiation source coupled to the core and configured to emit a laser radiation that is generally transmitted through at least the core.

In some embodiments, the apparatus may further include a pump mirror disposed along a longitudinal axis defined by the core. The pump mirror can be configured to be significantly transmissive to the excitation radiation and significantly reflective of the laser radiation. An output coupler can also be disposed along the longitudinal axis defined by the core and in opposition to the pump mirror, which output coupler can be configured to be partially reflective of the laser radiation.

In yet another aspect, a method is provided that includes providing a fiber including a core and a cladding. The core can extend longitudinally and can have a gain medium configured to provide amplification to laser radiation propagating along the core. The cladding may be exterior to the core and configured such that at least some excitation radiation has a low-loss propagation along the core and a lossy propagation of all modes of laser radiation along the core, and the loss of all modes of laser radiation is higher than the loss of the low-loss excitation radiation. The excitation radiation may be coupled to at least one mode in the core, the excitation radiation capable of being absorbed by the gain medium. In another embodiment, laser radiation may be coupled into the core, the laser radiation being generally transmitted through at least the core. In yet other embodiments of the invention, at least one mirror is used to produce oscillation of the laser radiation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 24A:
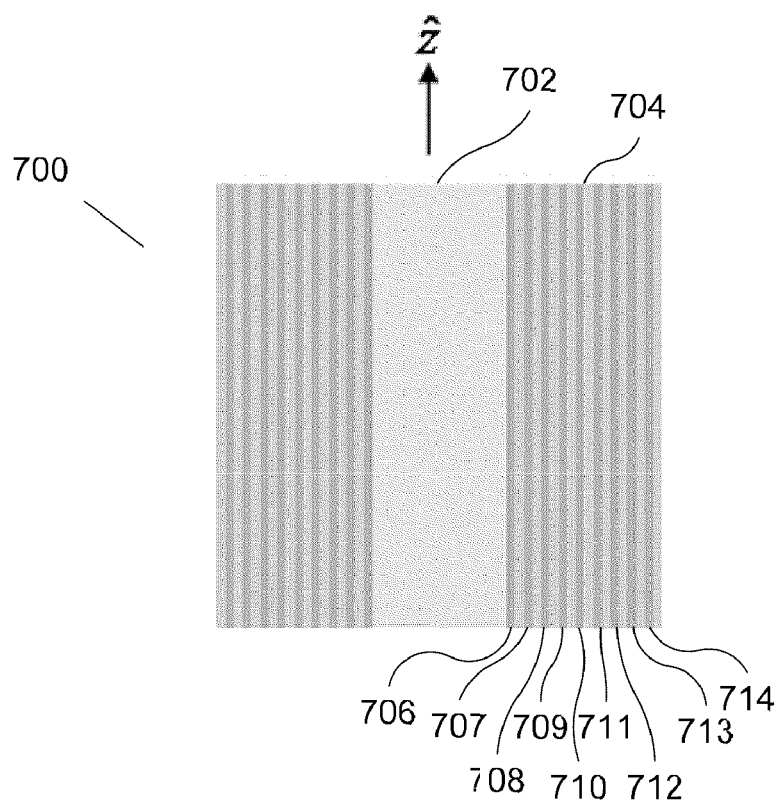
Figure 24B:
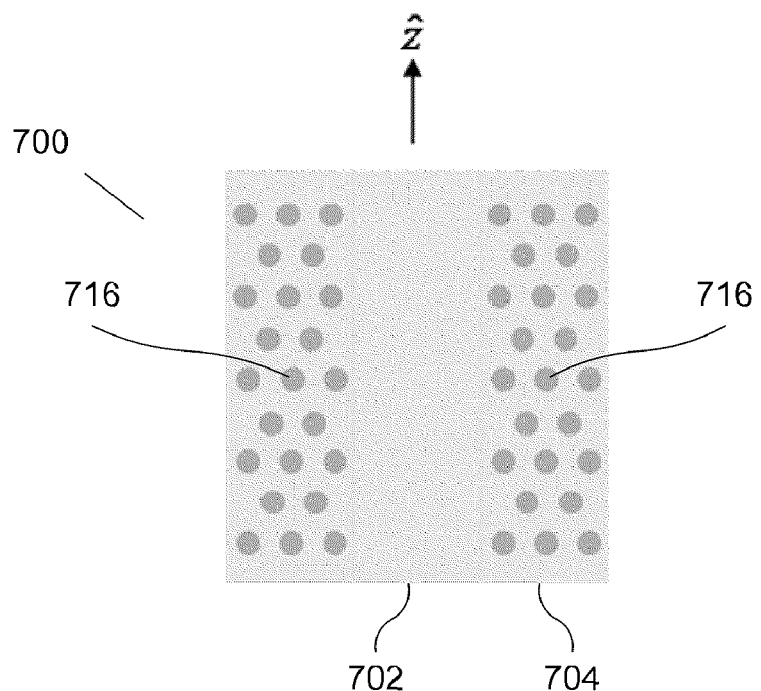
Figure 24C:
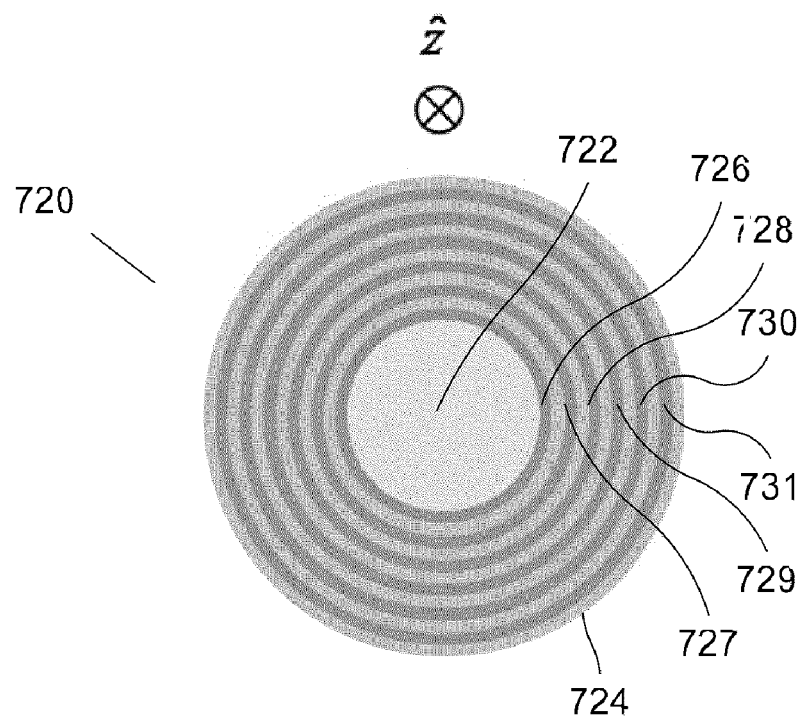
Figure 24D:
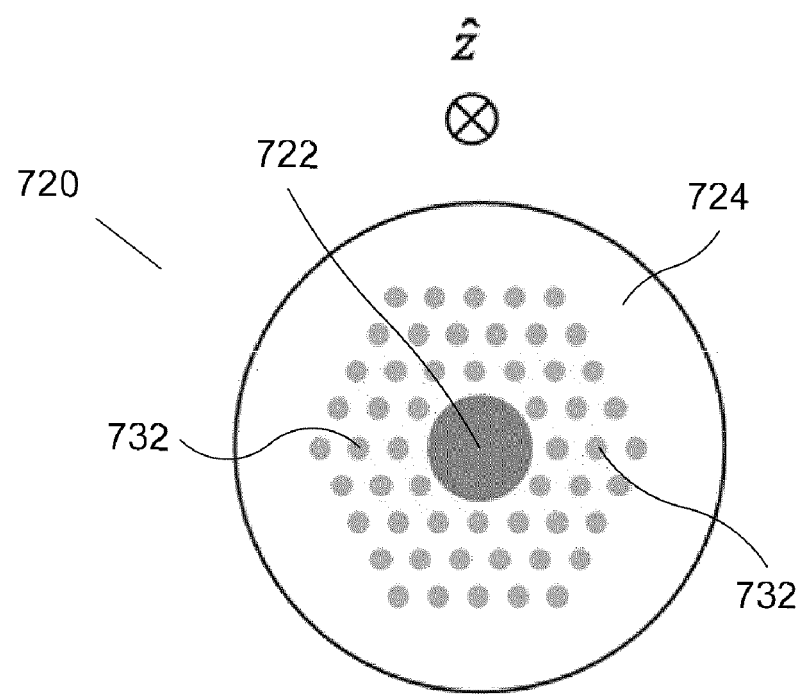
Figure 24E:
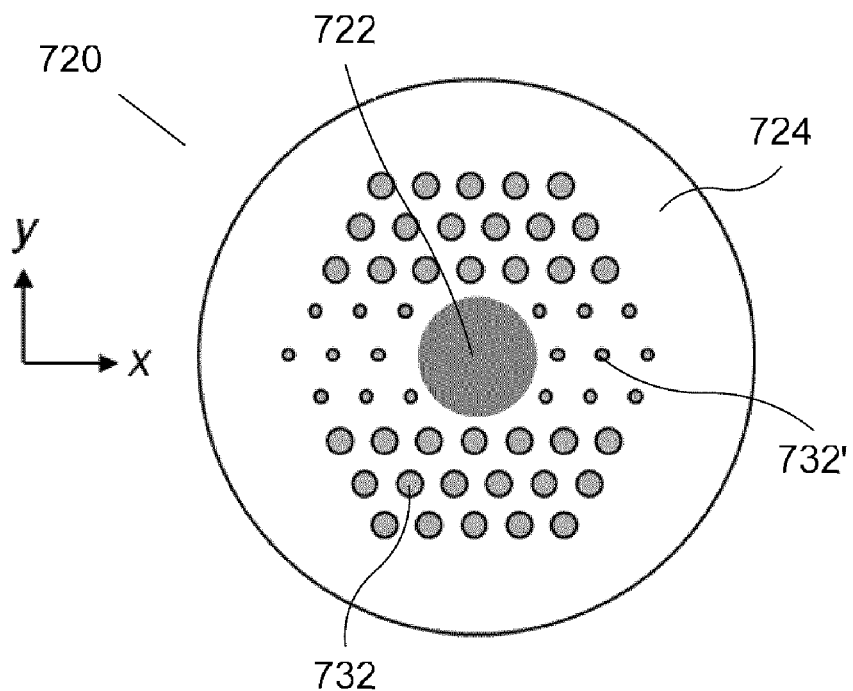
Figure 24F:
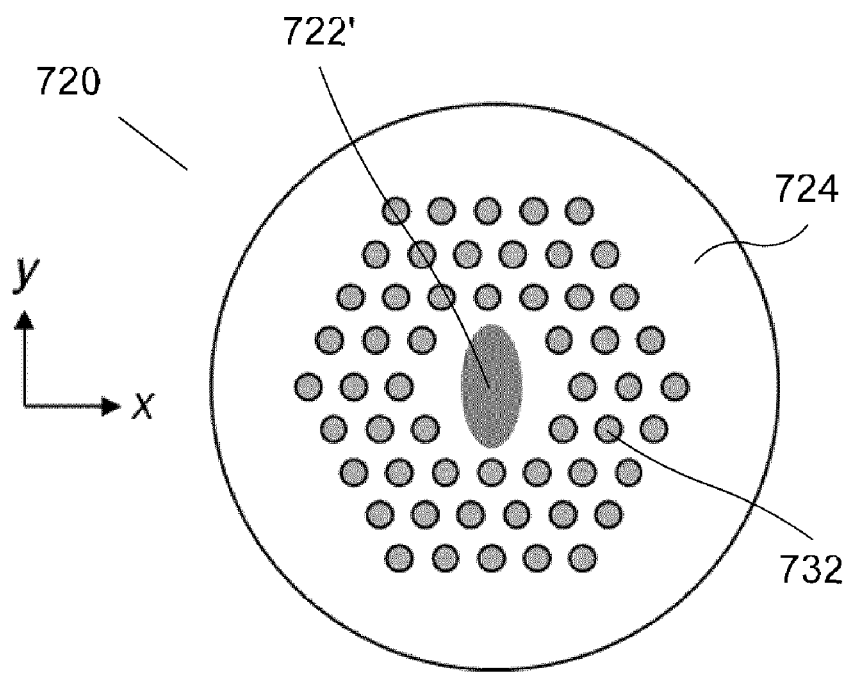
Figure 25A:
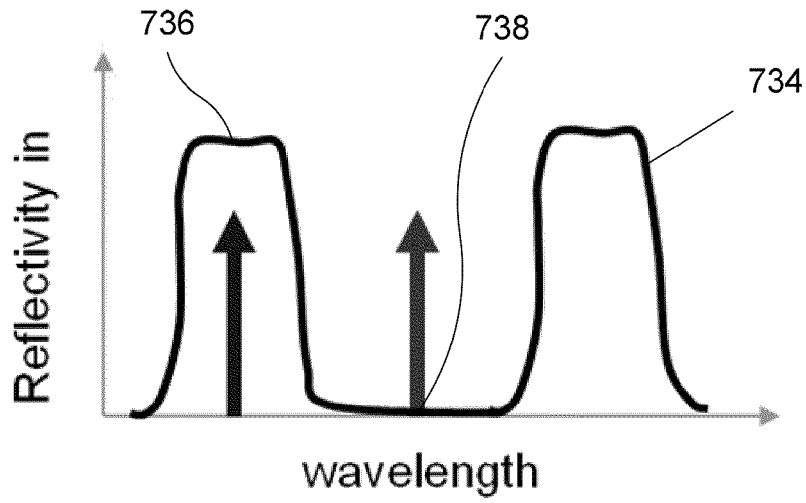
Figure 25B:
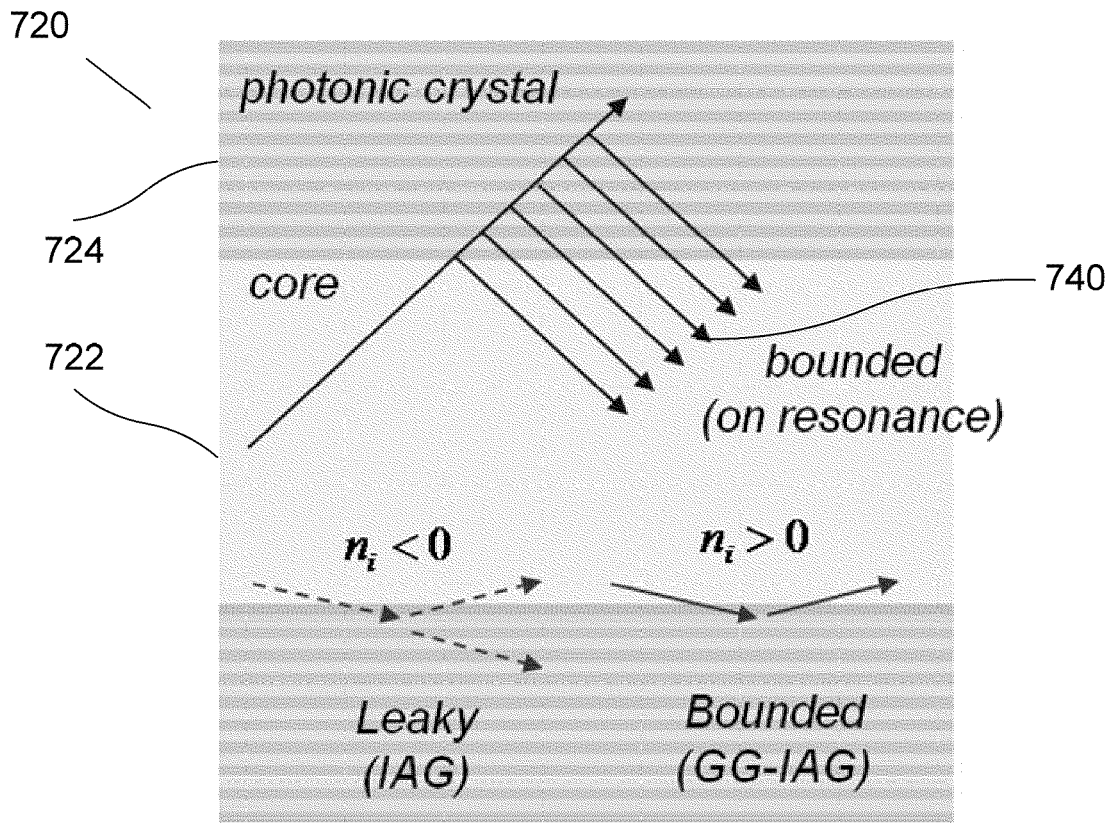
Figure 26:
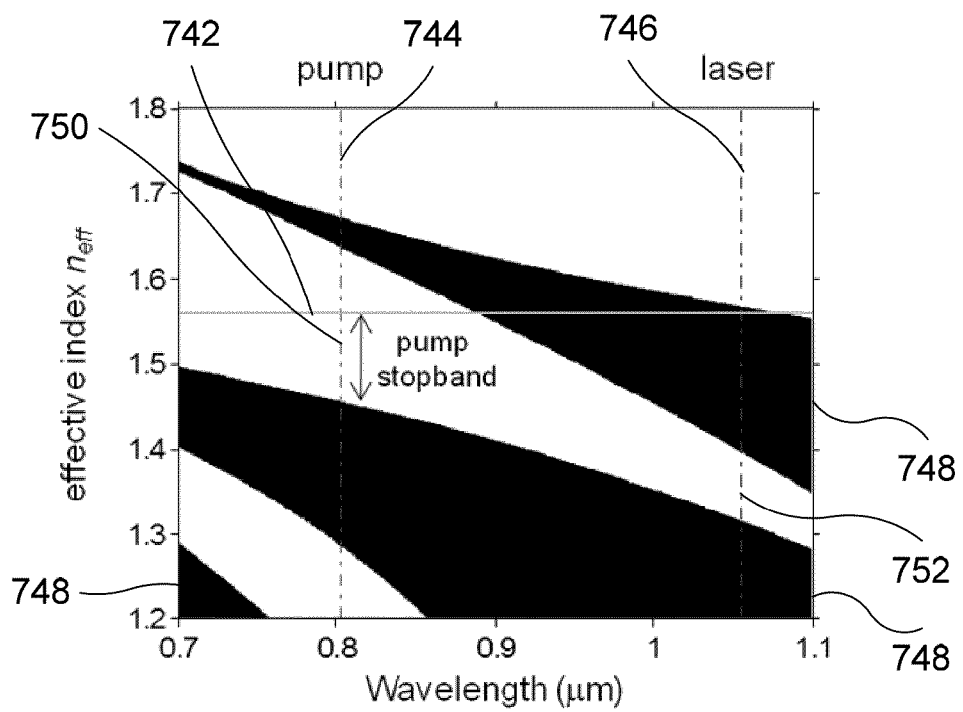
Figure 27A:
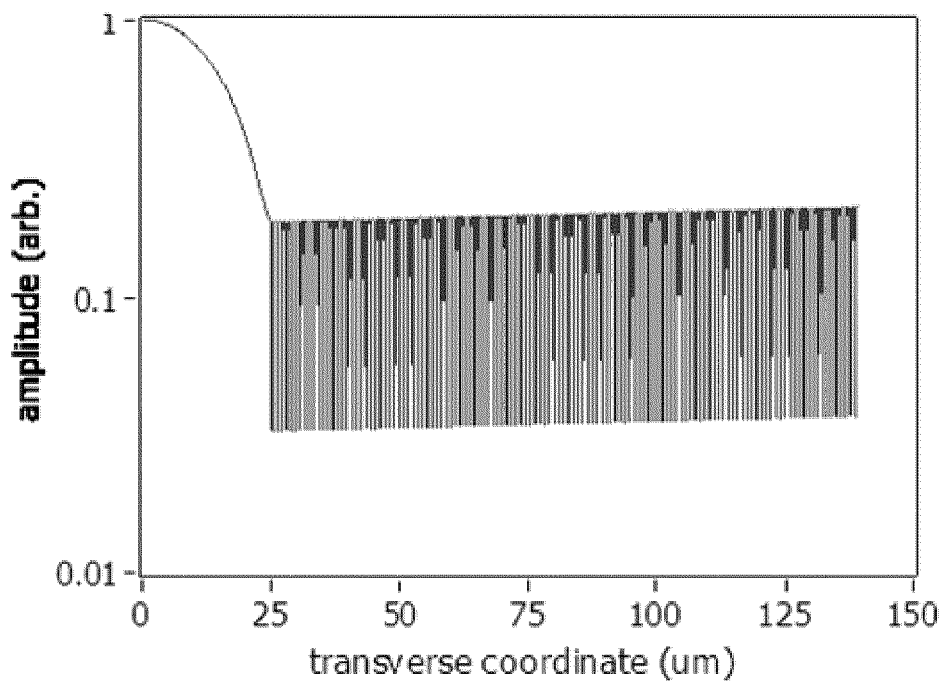
Figure 27B:
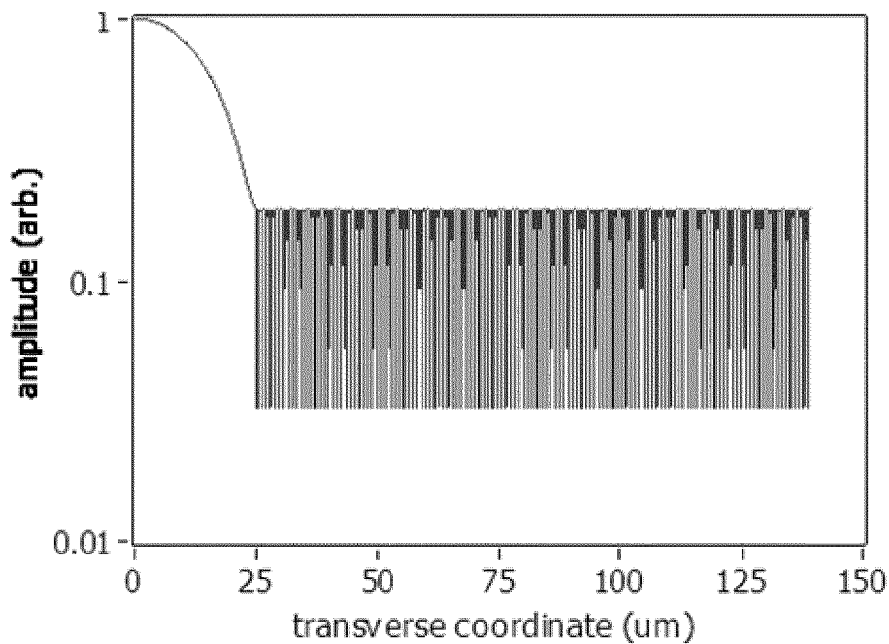
Figure 27C:
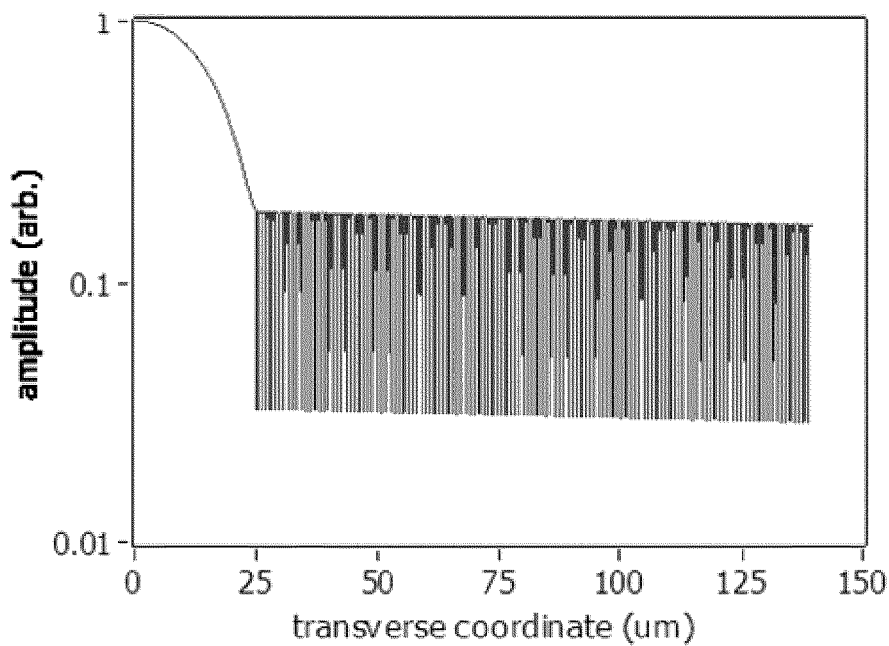
Figure 27D:
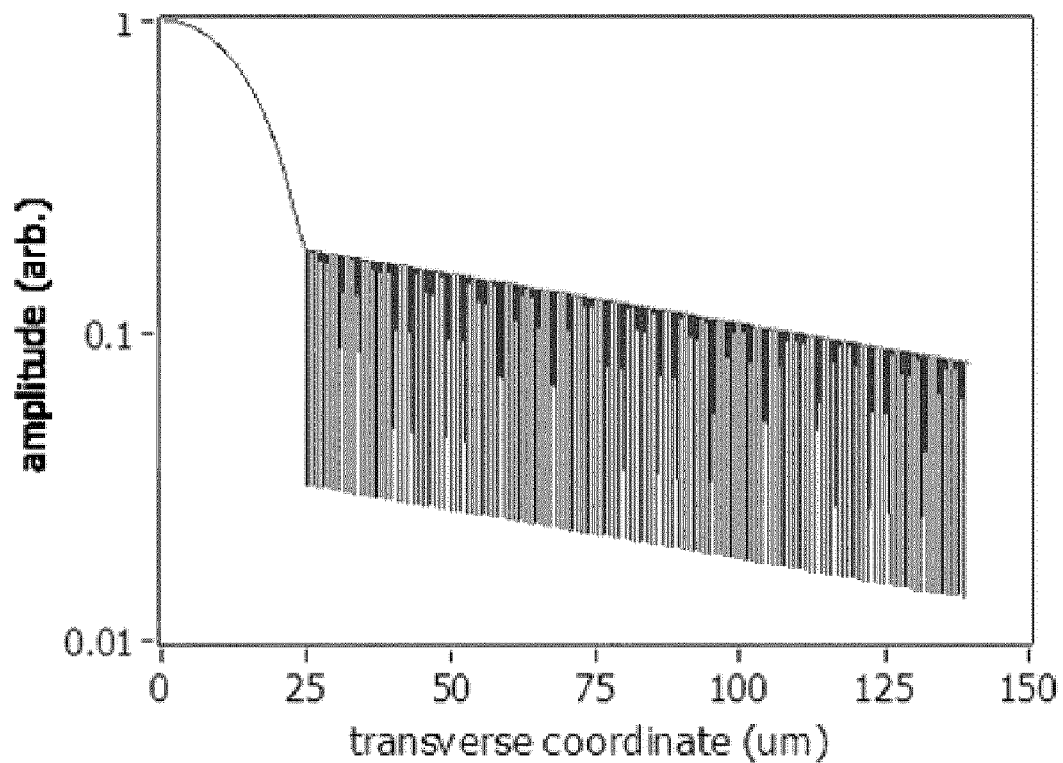
Figure 28A:
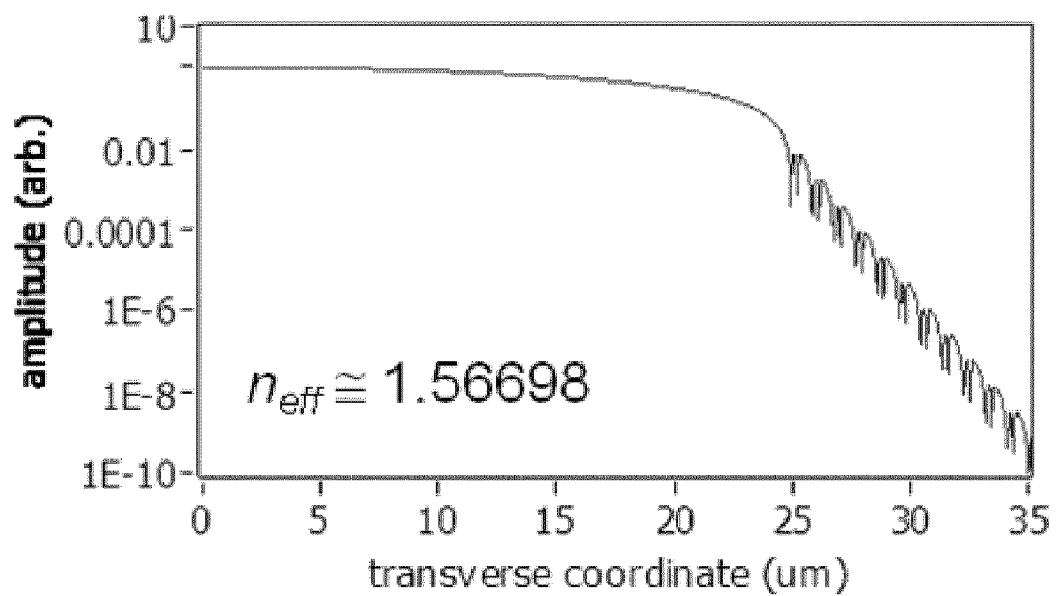
Figure 28B:
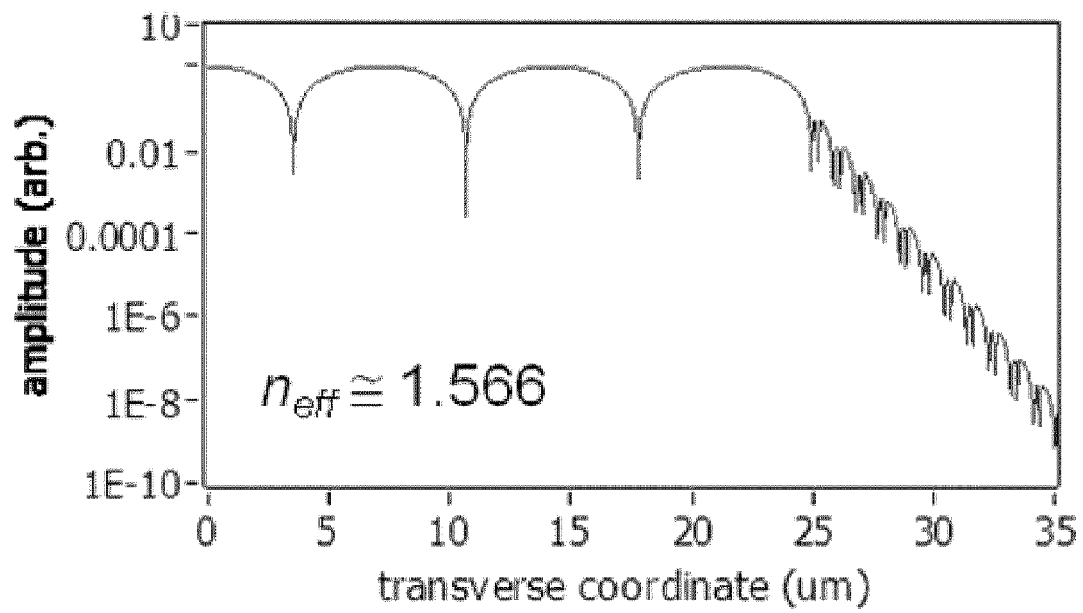
Figure 28C:
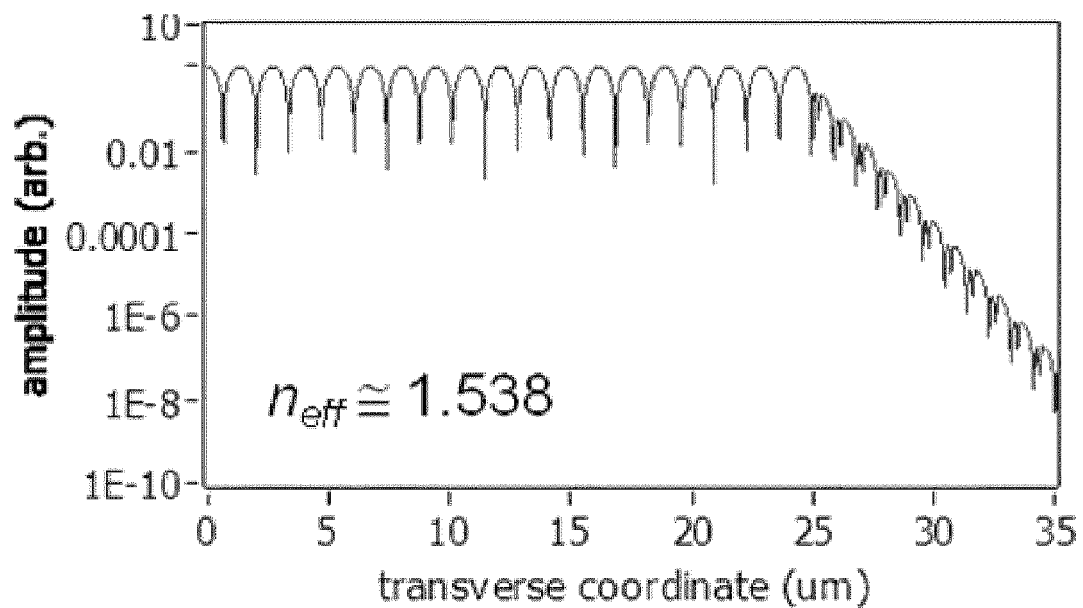
Figure 28D:
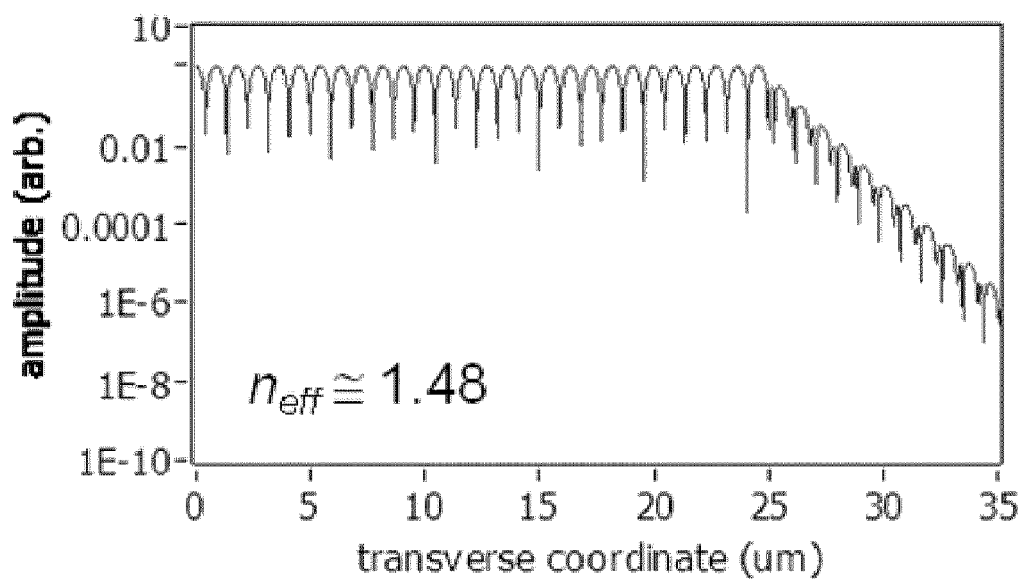
Figure 29:
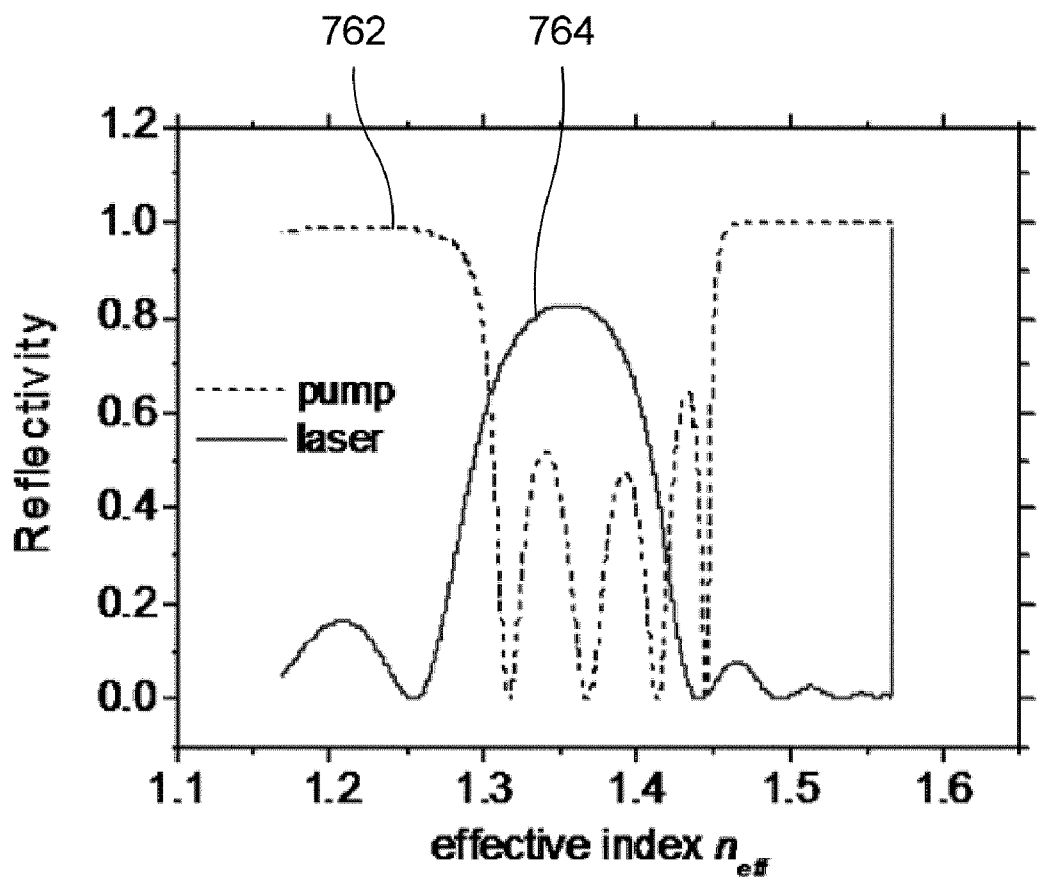
Figure 30:
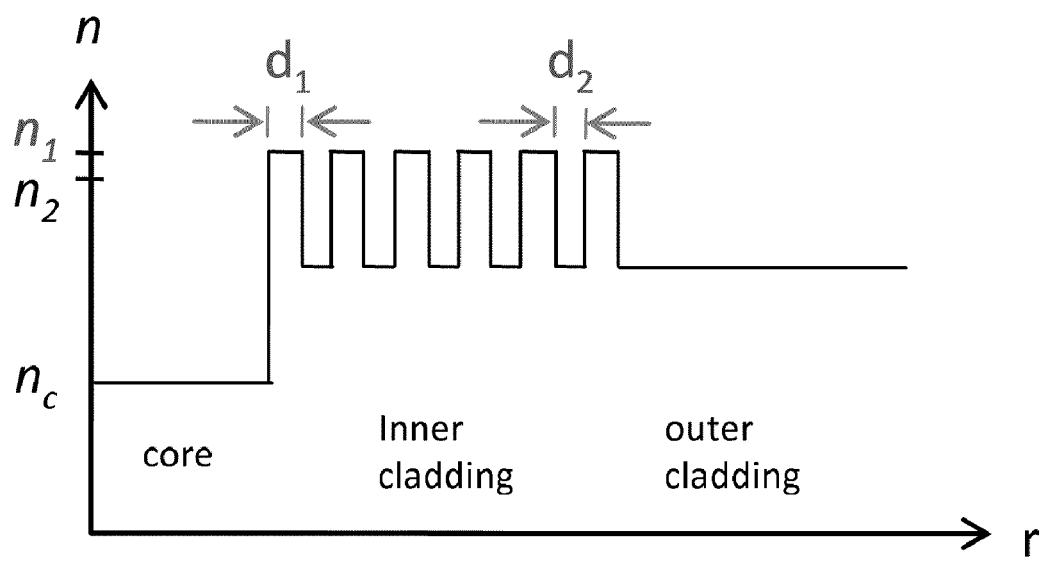
Figure 31:
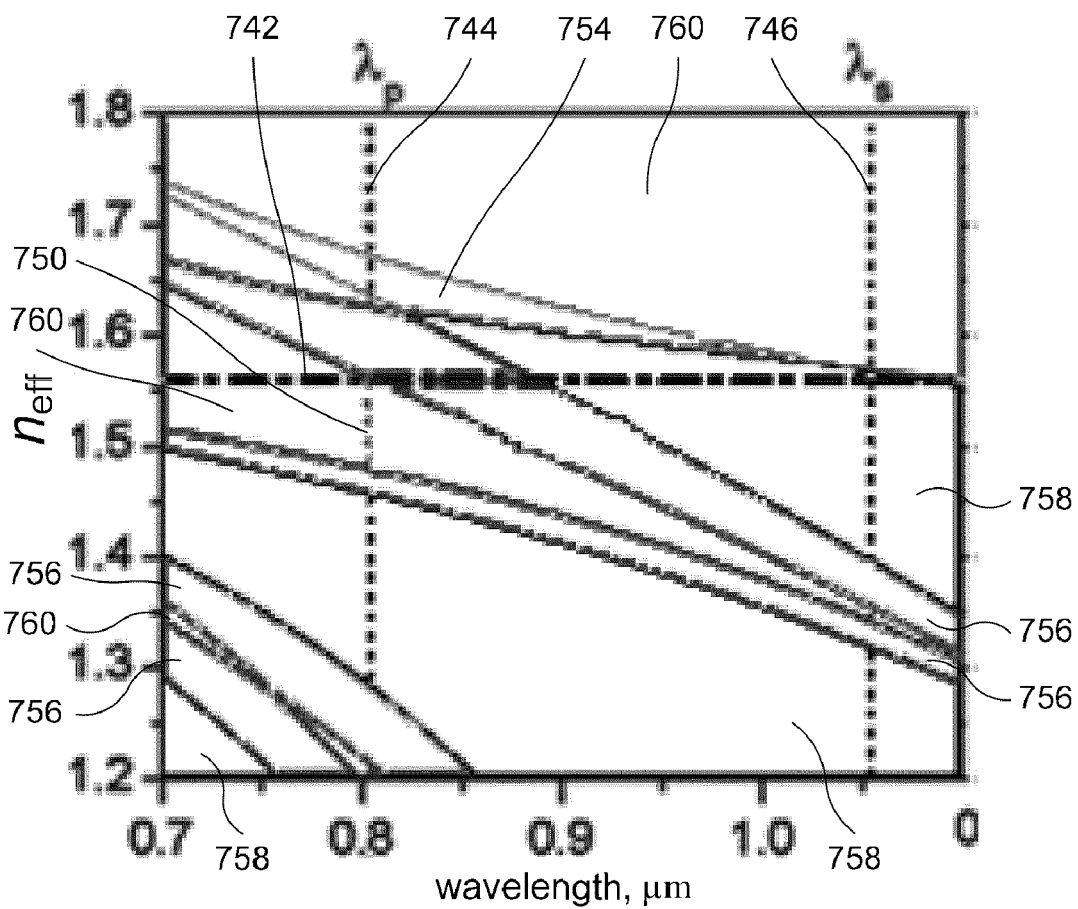
Figure 32A:
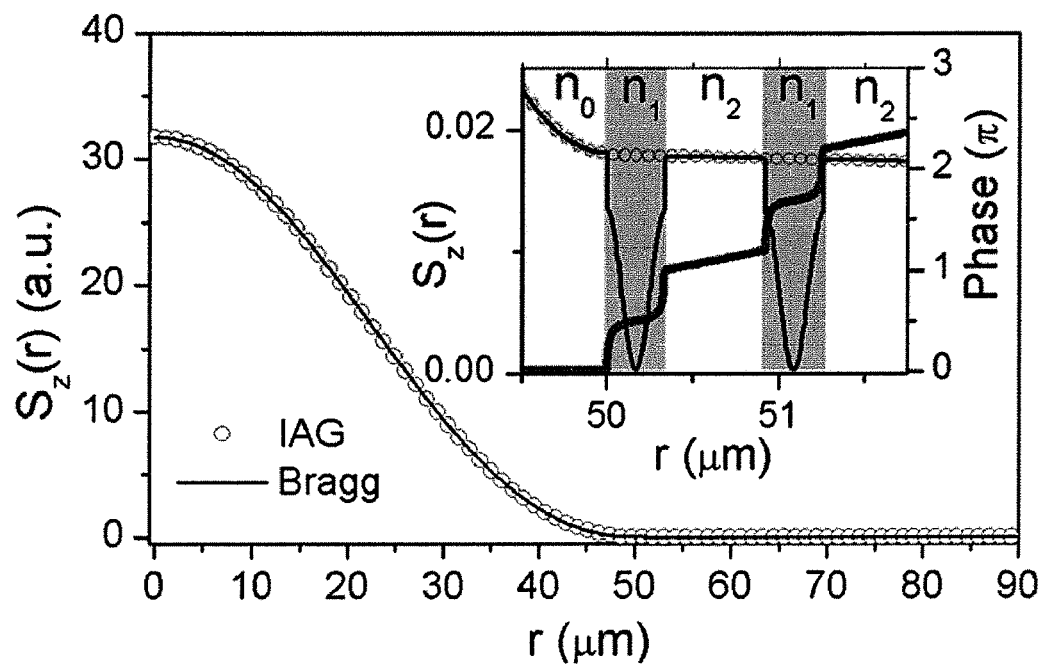
Figure 32B:
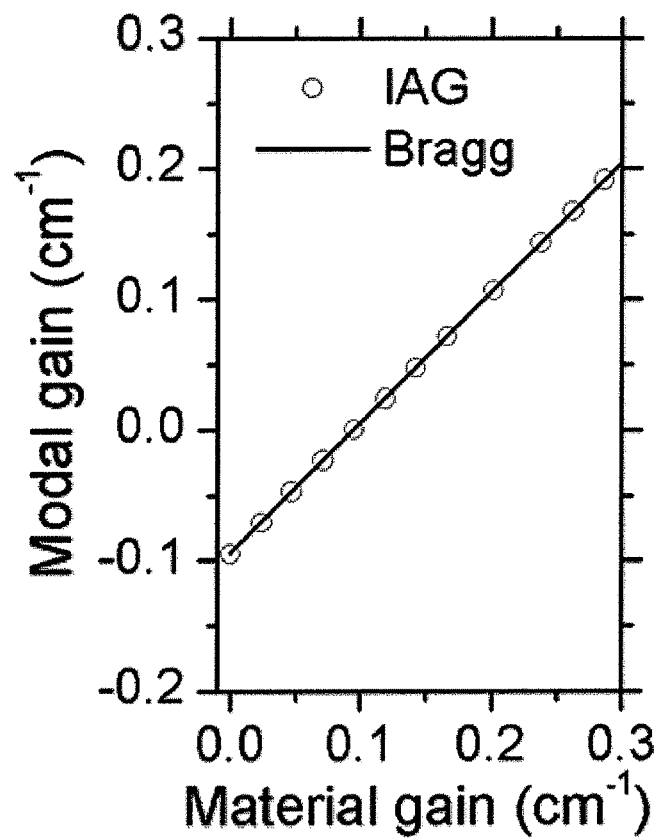
Figure 33:
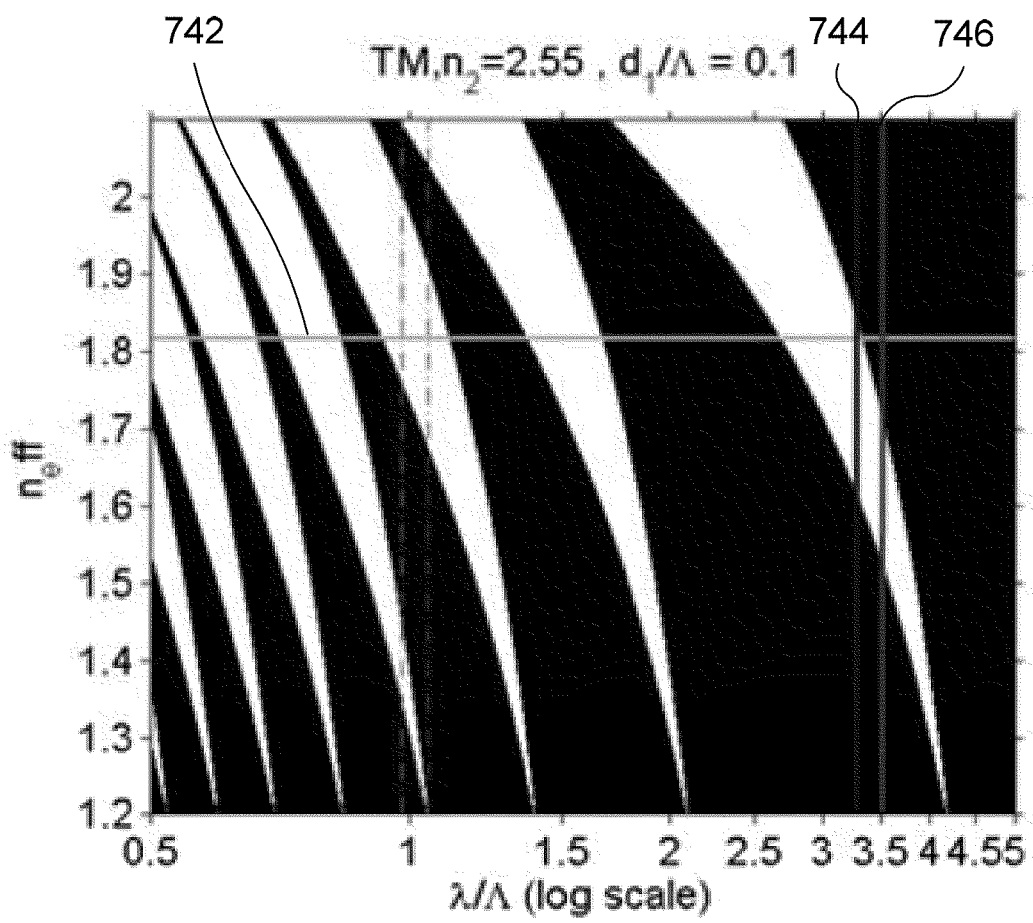
Figure 34A:
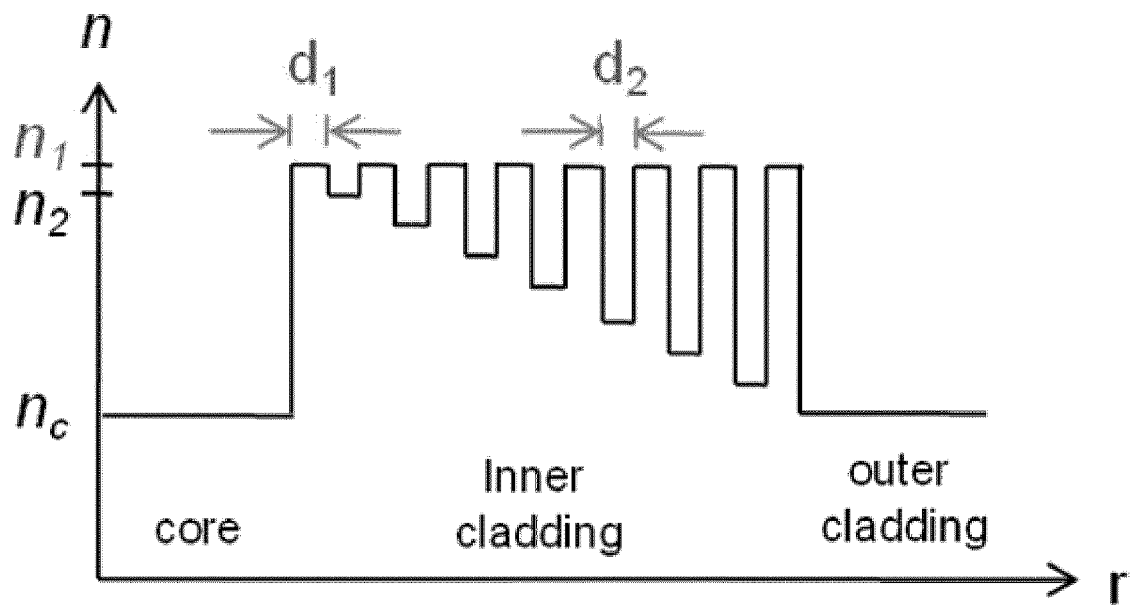
Figure 34B:
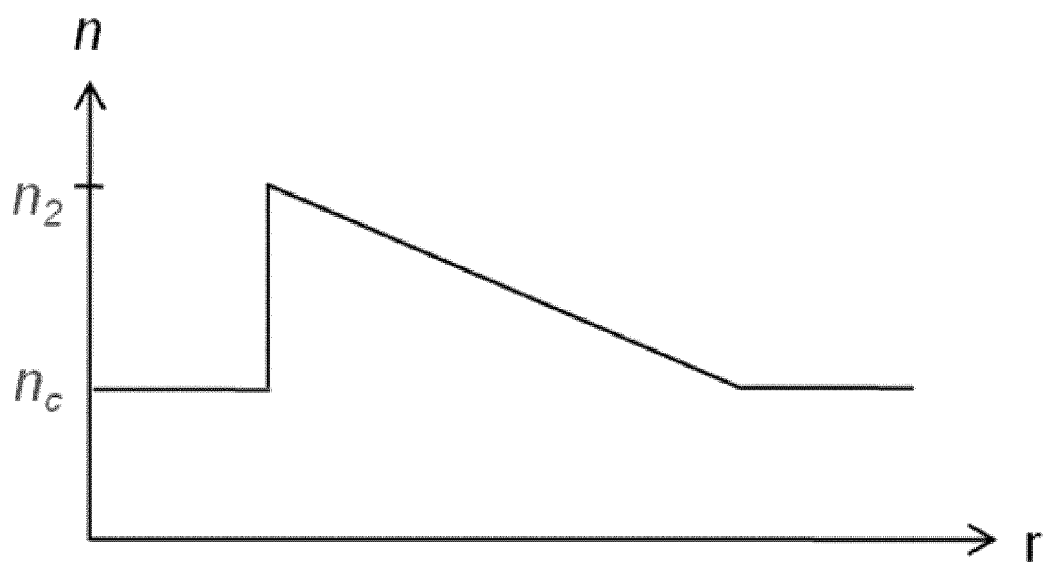

FIGS. 21A-D are schematic side views of a process for producing a waveguide configured in accordance with an example embodiment;

FIGS. 22A-C are schematic side views of another process for producing a waveguide configured in accordance with an example embodiment;

FIG. 23 is a side view, in partial cross section, of a fiber laser configured in accordance with an example embodiment;

FIG. 24A is a cross-sectional view of a slab waveguide having a cladding comprising a one dimensional alternating high and low index layers;

FIG. 24B is a cross-sectional view of a slab waveguide having a cladding comprising a two dimensional hexagonal array of empty or filled holes;

FIG. 24C is a cross-sectional view of a gain guided microstructure fiber having a cladding comprising a one dimensional alternating high and low index layers;

FIG. 24D is a cross-sectional view of a gain guided microstructured fiber having a cladding comprising a two dimensional hexagonal array of empty or filled holes;

FIG. 24E is a cross-sectional view of a photonic bandgap fiber with large birefringent with a rotationally symmetric core having uniform doping;

FIG. 24F is a cross-sectional view of a photonic bandgap fiber with very small or negligible birefringent with a rotationally asymmetric core having uniform doping;

FIG. 25A is a graphical representation of the reflectivity in a photonic crystal cladding plotted against varying wavelengths;

FIG. 25B is a cross-sectional view of a photonic crystal fiber showing the stopband of the cladding resonates pump radiation allowing the pump radiation to be confined to the core of the waveguide;

FIG. 26 is a graphical representation of the photonic band-structure of an exemplary Bragg layer, according to an embodiment of the invention, having infinite pairs for TE polarization;

FIG. 27A is a graphical representation of the amplitude profile in the core a passive waveguide having no material gain;

FIG. 27B is a graphical representation of the amplitude profile in the core of a waveguide having a gain coefficient in the core such that the imaginary part of its effective refractive index is zero;

FIG. 27C is a graphical representation of the amplitude profile in the core of a waveguide having a material gain in the core that is approximately twice that of the passive loss;

FIG. 27D is a graphical representation of the amplitude profile in the core of a waveguide having a material gain in the core that is approximately eight times that of the passive loss;

FIG. 28A-28D are graphical representations of the amplitude profiles in the core of a waveguide for varying effective modal indices;

FIG. 29 is a graphical representation of reflectance for pump radiation and laser radiation in a six pair Bragg mirror at TE polarization;

FIG. 30 is a graphical representation of the refractive index profile of a Bragg waveguide or fiber of the invention having equivalent layers;

FIG. 31 is a TE and TM band diagram of an infinite Bragg cladding;

FIG. 32A is a graphical representation of the overlapped radial profiles of $S_z$ of the $HE_{11}$ mode for both the IAG and Bragg fibers;

FIG. 32B is a graphical representation of the modal gain coefficient of the $HE_{11}$ mode as a function of the material gain for both the IAG and Bragg fibers;

FIG. 33 is a graphical representation of the normalized photonic bandstructure of Bragg layers, according to certain embodiments of the invention, for TM polarization;

FIG. 34A is a graphical representation of the refractive index profile of a Bragg waveguide or fiber having a high-index layer meeting the absentee-layered condition and a low-index layer having an index decreasing in a stepwise manner; and FIG. 34B is a graphical representation of the refractive index profile of a Bragg waveguide or fiber having a linearly chirped index-antiguiding profile.

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIGS. 3-6, therein is shown a fiber laser amplifier 100 configured in accordance with an example embodiment. The fiber laser amplifier 100 includes a fiber 102 or other elongated structure for guiding waves, a signal or laser radiation source 104, and an excitation or "pump" radiation source 106. The fiber 102 may have a core 108, such as an optical fiber formed, say, of glass or plastic, that extends along a longitudinal direction l. A cladding 110 may be disposed radially exterior to the core 108. For example, the core 108 may be cylindrical, and the cladding 110 may partially or completely radially surround the core, such as by being formed of a "Bragg grating," wherein a series of alternating layers 112a, 112b are stacked transversely to the core (i.e., transversely to the longitudinal direction l defined by the core). The layers 112a, 112b may be respectively composed of materials with alternating indices of refraction $n_{c1}$ and $n_{c2}$.

The core 108 may include a gain medium 114 configured to provide amplification to laser radiation of appropriate wavelength propagating along the core. In some embodiments, the gain medium 114 may include an optical fiber incorporating a dopant 116 that is configured to provide laser amplification when activated by excitation radiation. Examples of materials that may be used as dopants include, for example, ions of erbium, ytterbium, neodymium, dysprosium, praseodymium, holmium, and/or thulium. These ions may act to absorb radiation (i.e., excitation radiation) of wavelengths appropriate to excite the ions into one or more metastable states, thereby "activating" the gain medium. Once the ions have been excited, incoming radiation of appropriate wavelength may then interact with the excited ions to produce stimulated emission and amplification of the incoming radiation.

The core 108 and cladding 110 can be configured such that radiation propagating transversely through the core (i.e., propagating along a direction having a non-zero transverse component, such that the radiation is directed at least somewhat towards the cladding) is generally transmitted by the cladding (i.e., the cladding 110 is "leaky"). For example, the core 108 can have an effective core index of refraction $n_{co}$ that is lower than an effective cladding index of refraction $n_{cl}$ associated with the cladding 110, where the effective index of refraction may, in some cases, be represented by a spatial average index of refraction for the materials making up either the core or the cladding. That is, for either the core or the cladding, the effective index of refraction may be a weighted average of the respective indices of refraction of the constituent materials, with each constituent material contributing to the effective index by an amount proportional to the spatial proportion of that material relative to the whole. In other embodiments of the invention, the effective index of refraction is unrelated to the spatial average index of refraction based upon the materials making up the core and/or the cladding. In this way, the total internal reflection mechanism for propagating radiation through the core 108 is precluded. Fibers for which the core has a lower index of refraction than the cladding are referred to as "index-antiguided" fibers (or "IAG fibers"). Radiation propagating transversely along the core 108 of the fiber 102 (or any waveguiding structure) is said to be associated with a "transverse mode" of propagation.

Figure 3:
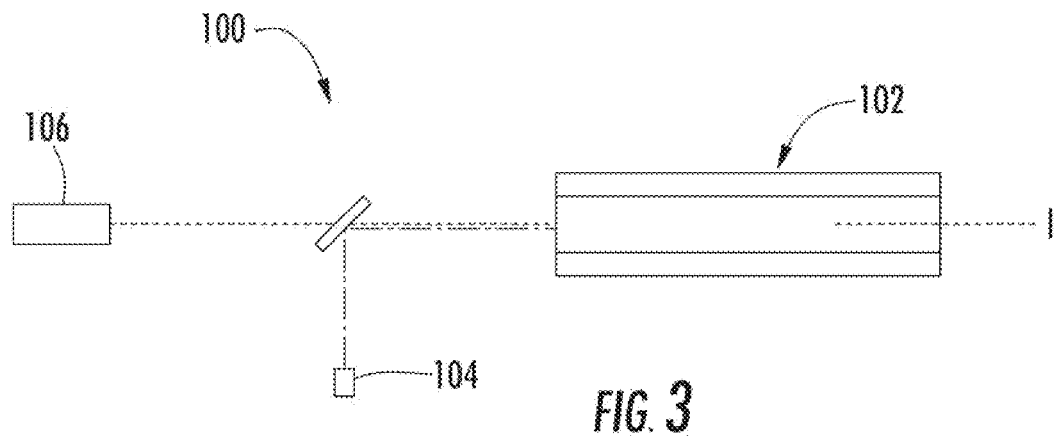
FIG. 3 is a side view, in partial cross section, of a fiber laser amplifier configured in accordance with an example embodiment.

Referring to FIG. 3, the signal or laser radiation source 104 may be, for example, a seed laser that is solid-state, liquid, or gas in nature and that can be continuous wave or pulsed, including, without limitation, fiber lasers, diode laser, dye lasers, gas lasers, etc. The excitation radiation source can be any source configured to emit radiation capable of promoting electrons associated with the dopant ions. For example, flash lamps, light-emitting diodes (LEDs), fiber lasers, and/or diode lasers may be utilized as the excitation radiation source. The excitation radiation source may emit radiation that is not spatially coherent. As described in more detail below, the signal and excitation radiation sources 104, 106 may be configured such that radiation emitted by the radiation sources is received by the fiber 102, with a portion of the radiation being propagated along the fiber.

Figure 7:
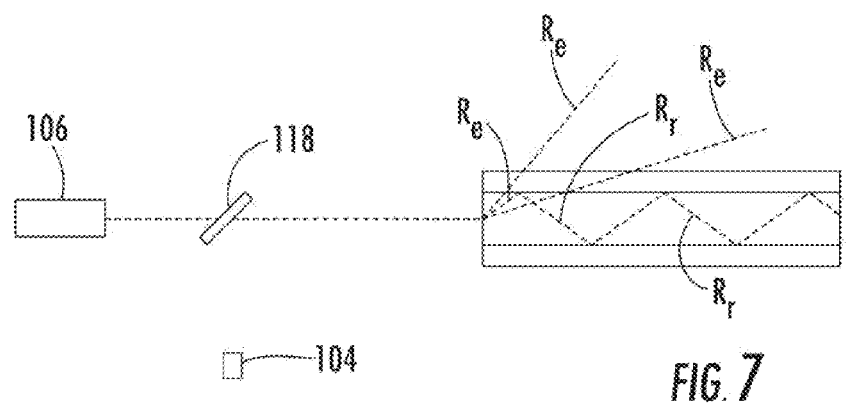
FIG. 7 is a side view, in partial cross section, of the fiber laser amplifier of FIG. 3, illustrating the propagation of excitation radiation.
Figure 17:
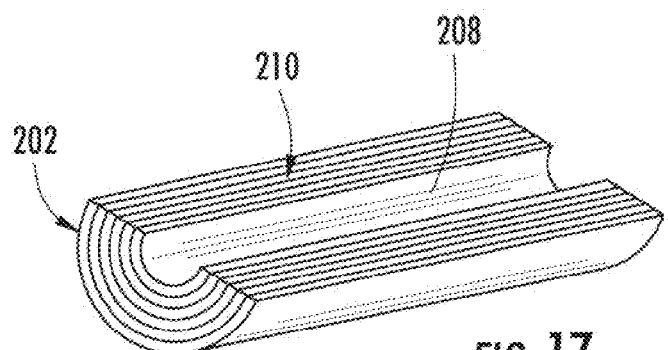
FIG. 17 is a perspective view of the fiber core of FIG. 15, wherein the fiber is sectioned to reveal its interior.
Figure 18:
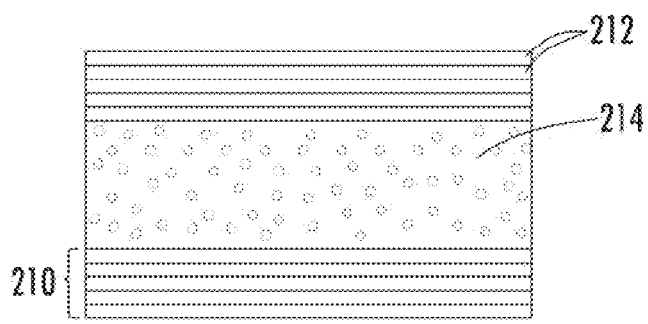
FIG. 18 is a cross-sectional view of the fiber of FIG. 15.
Figure 8:
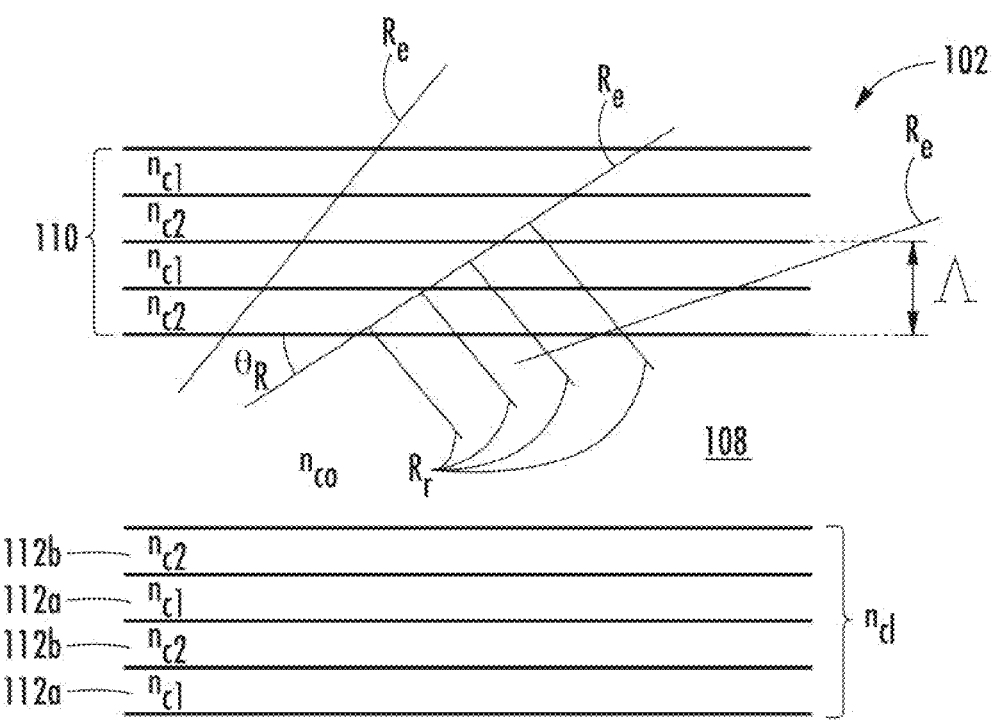
FIG. 8 is a magnified cross-sectional view of the fiber of FIG. 7.

Referring to FIGS. 7 and 8, the excitation radiation source 106 can be coupled to the core 108 such that excitation radiation $R_e$ emitted from the excitation radiation source enters the core. For example, the output of the excitation radiation source 106 can be coupled to the core 108 using lenses, mirrors, filters, couplers, and/or other such components used for directing radiation (not shown). The cladding 110 and excitation radiation source 106 may be configured such that some excitation radiation $R_e$ propagating transversely through the core 108 (say, one or more propagation modes) will tend to be resonantly reflected by the cladding. For example, reflections from the interfaces between various layers 112a, 112b in the cladding 110 may constructively interfere with one another, producing reflected radiation $R_r$. Such resonant reflections can occur when the period of repetition or pitch $\Lambda$ of the layers 112a, 112b and the angle of incidence $\theta_R$ of the excitation radiation $R_e$ obey the relationship $$\Lambda = \lambda/2n_r \sin\theta_R \quad (1)$$

where $\lambda$ is the wavelength of the excitation radiation $R_e$ and $n_r$ is the real part of the effective index of refraction $n_{cl}$ of the cladding 110 (e.g., affected by the indices of refraction $n_{c1}$ and $n_{c2}$ for the layers 112a, 112b). The reflected portion $R_r$ of the excitation radiation $R_e$ can then interact with and activate the gain medium 114, enabling amplification of subsequent incoming laser radiation. The bandwidth $\Delta\lambda$ of the cladding at its resonance is $\Delta\lambda = \lambda^2 \kappa/(\pi n_{cl} \sin\theta_R)$, where $\kappa$ is the coupling constant of the grating and is proportional to the difference between alternating indices of refraction $n_{c1}$ and $n_{c2}$. For other angles of incidence of the excitation radiation $R_e$ with respect to the cladding 110, the reflected excitation radiation will not constructively interfere, and such radiation will be essentially transmitted by the cladding 110. As the reflected portion of the radiation $R_r$ propagates along the core 108, it may be somewhat or highly multi-modal.

Figure 9:
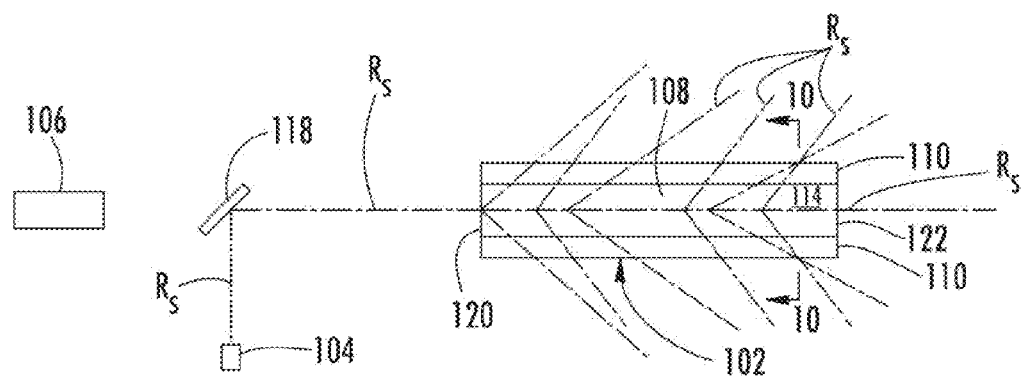
FIG. 9 is a side view, in partial cross section, of the fiber laser amplifier of FIG. 3, illustrating the propagation of laser radiation in the absence of excitation radiation.
Figure 10:
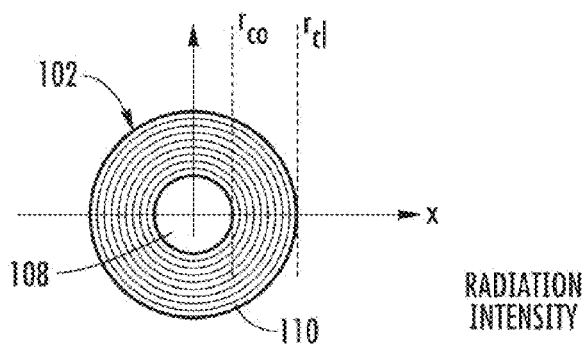
FIG. 10 is a cross-sectional view taken along line 10-10 of FIG. 9.
Figure 11:
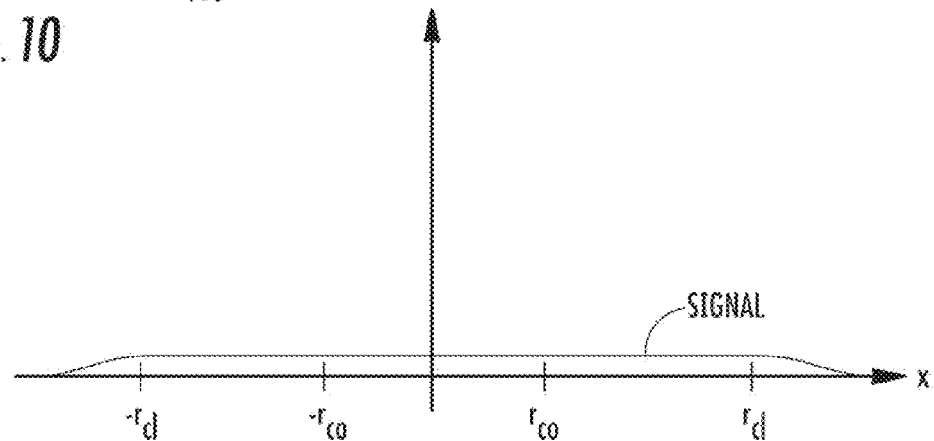
FIG. 11 is a schematic plot of the intensities of both pump and laser radiation as a function of position within the fiber of FIG. 9.
Figure 13:
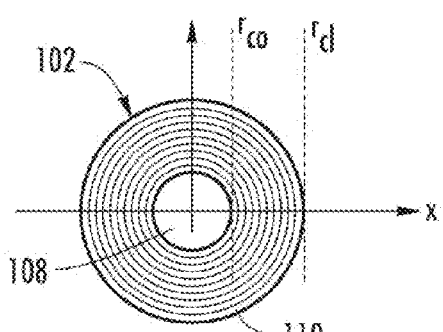
FIG. 13 is a cross-sectional view taken along line 13-13 of FIG. 12.
Figure 14:
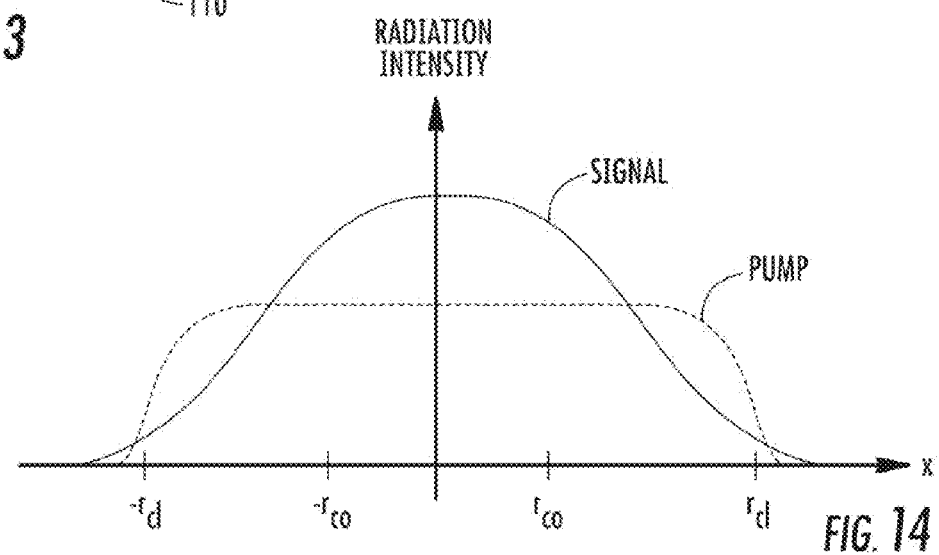
FIG. 14 is a schematic plot of the intensities of both pump and laser radiation as a function of position within the fiber of FIG. 12.
Figure 15:
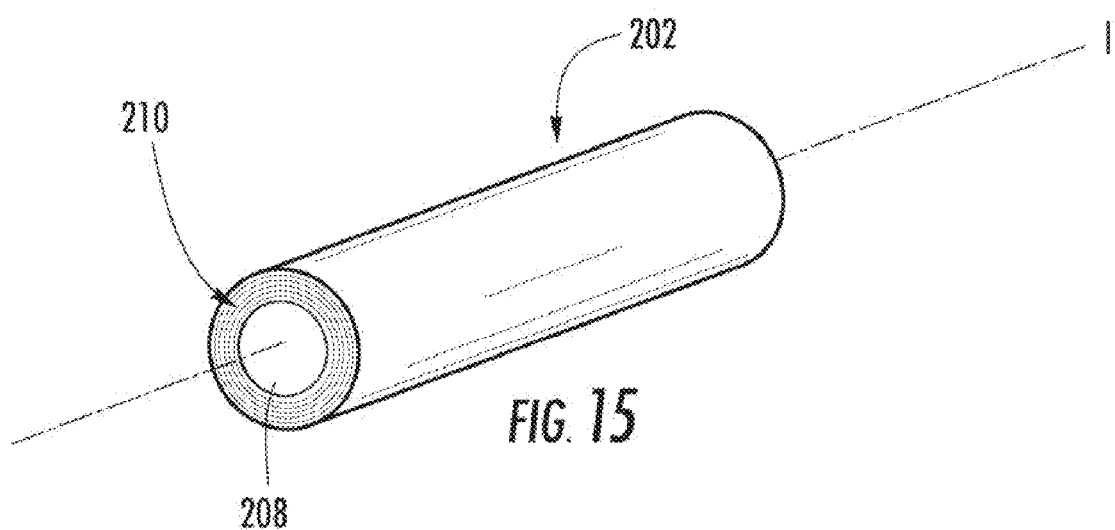
FIG. 15 is a perspective view of a fiber configured in accordance with another example embodiment.
Figure 16:
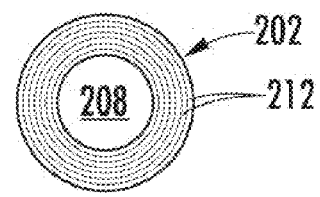
FIG. 16 is an end view of the fiber of FIG. 15.
Figure 21A:
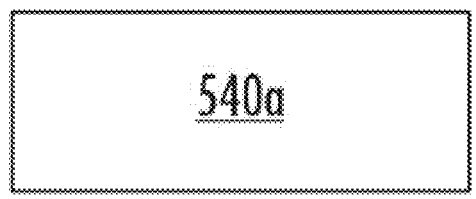
Figure 21B:
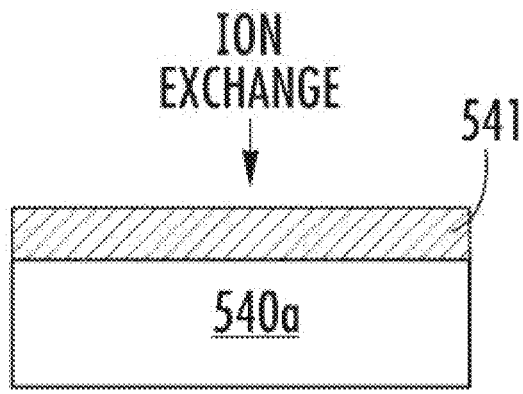
Figure 21C:
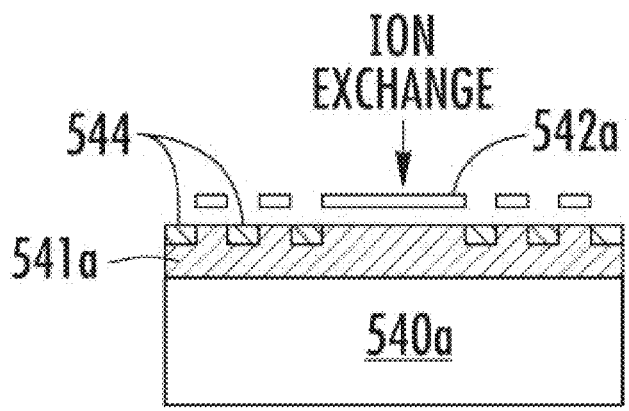
Figure 21D:
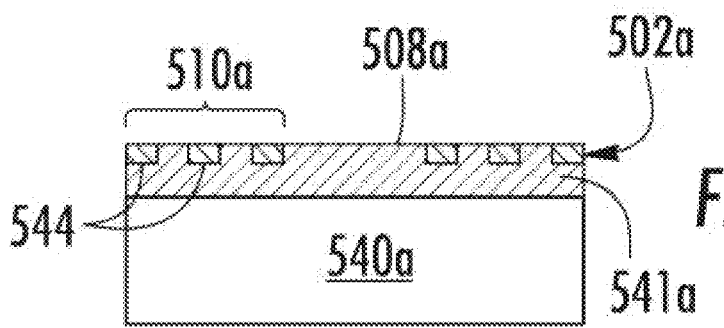

Referring to FIGS. 9-14, the signal or laser radiation source 104 can be coupled to the core 108 such that signal or laser radiation $R_s$ emitted from the signal or laser radiation source enters the core (e.g., enters an input end 120 of the core). For example, a beam splitter 118 can be used to receive signal or laser radiation $R_s$ from one direction and direct the radiation into the core 108 while allowing excitation radiation $R_e$ propagating along another direction to pass through and enter the core. As mentioned above, the core 108 and cladding 110 can be configured, along with the signal or laser radiation source 104, such that the signal or laser radiation $R_s$ is transmitted by the cladding and propagates out of the fiber 102 in a variety of directions (e.g., as where the effective index of refraction of the core $n_{co}$ is less than that of the cladding $n_{cl}$). In other words, the cladding 110 may be leaky with respect to most or all of the propagation modes of the signal or laser radiation $R_s$. When the excitation radiation source 106 is not emitting excitation radiation $R_e$ into the core 108 (as illustrated in FIG. 9), the intensity of the signal or laser radiation $R_s$ at points along the fiber 102 and spaced from the input end 120 is generally low (see FIGS. 10 and 11). The intensity may be fairly uniform in the variety of directions, as shown in FIGS. 10 and 11, for cases where the signal or laser radiation $R_s$ activates many propagation modes, or may be nonuniform where only a few propagation modes are active. In either case, the intensity of the signal or laser radiation will be low due to propagation losses. Some of the signal or laser radiation $R_s$ does propagate through the core 108 and is emitted from the output end 122 thereof. However, because much of the signal or laser radiation $R_s$ has escaped the core 108 before reaching the output end 122, the energy associated with the radiation being emitted at the output end is relatively small compared to that being emitted by the signal or laser radiation source 104 into the input end 120.

Figure 12:
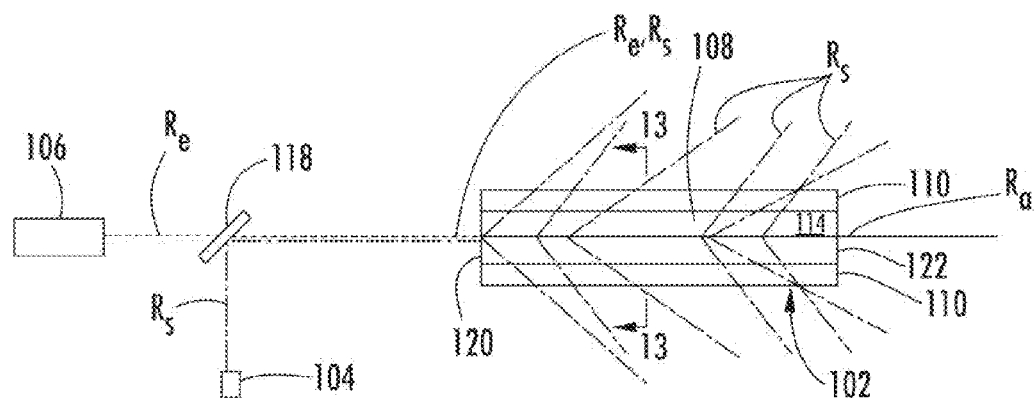
FIG. 12 is a side view, in partial cross section, of the fiber laser amplifier of FIG. 3, illustrating the propagation of laser radiation in the presence of excitation radiation.

When the excitation radiation source 106 is emitting excitation radiation $R_e$ into the core 108 (as illustrated in FIG. 12), the gain medium 114 is activated thereby. Under these conditions, signal or laser radiation $R_s$ propagating along the core 108 interacts with the activated gain medium and is continuously amplified as it advances along the core (this amplified portion of the signal or laser radiation is denoted as $R_a$ in FIG. 12).

For signal or laser radiation $R_s$ propagating substantially parallel to the longitudinal direction l defined by the core 108 (i.e., the lowest order mode or a first order mode of propagation), propagation loss is less than the loss of higher order modes of propagation that have a greater number of transverse components than the first order mode. Therefore, when the amplified signal or laser radiation $R_a$ is ultimately emitted from the output end 122 of the core 108, the intensity associated with the lowest order mode of propagation is increased faster relative to that associated with higher order modes of propagation (see FIGS. 13 and 14). As such, despite the fact that some of the input energy from the signal or laser radiation source 104 might have been distributed within higher order modes, the intensity of the amplified signal or laser radiation $R_a$ being emitted from the output end 122 is both of acceptable magnitude to allow for signal extraction or other subsequent uses and mainly representative of the lowest order mode of propagation. It is noted that the decay of the signal and/or pump radiation when moving away from the central axis of the fiber 102 can be faster or slower than that depicted in FIG. 14, and FIG. 14 should therefore be understood to be a general representation of radiation intensity. Further, the intensities of the signal and pump radiation need not tend towards zero at the outer radius of the cladding (i.e., when $x \approx r_{cl}$), but may tend towards zero outside the outer radius of the cladding (i.e., $x > r_{cl}$) or well inside the outer radius of the cladding (i.e., $x \ll r_{cl}$).

As mentioned above, signal or laser radiation $R_s$ propagating along the core 108 in a direction substantially parallel with the longitudinal direction l (this corresponding to the lowest order mode of propagation of the signal or laser radiation along the core) ultimately emerges from the output end 122 of the fiber 102 with intensity that is increased faster relative to that associated with other modes of propagation. As mentioned, radiation associated with all of the modes of propagation will experience amplification, but the propagation losses associated with the higher order modes will be greater than those for the lowest order mode. The gain provided by the gain medium 114 can be tailored to provide amplification sufficient such that the intensity of the radiation associated with the lowest order mode of propagation reaches a useful or non-trivial level while the intensity of the radiation associated with the higher order modes of propagation are at relatively low levels. The lowest order mode of propagation is then said to be "confined" by the gain, while higher order modes remain leaky. This amplification-induced discrimination between radiation associated with lower and higher order modes of propagation is referred to as "gain guiding." Further details regarding gain guiding can be found in U.S. Pat. No. 6,751,388 to Siegman, which is incorporated herein by reference in its entirety.

Figure 1:
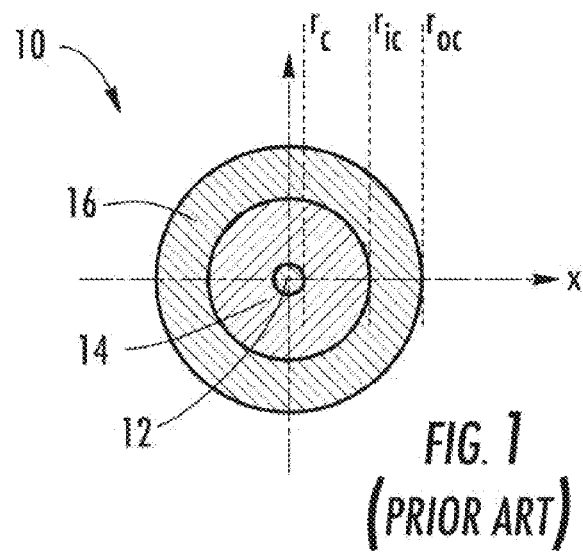
FIG. 1 is a cross-sectional view of a double-cladding fiber.
Figure 2:
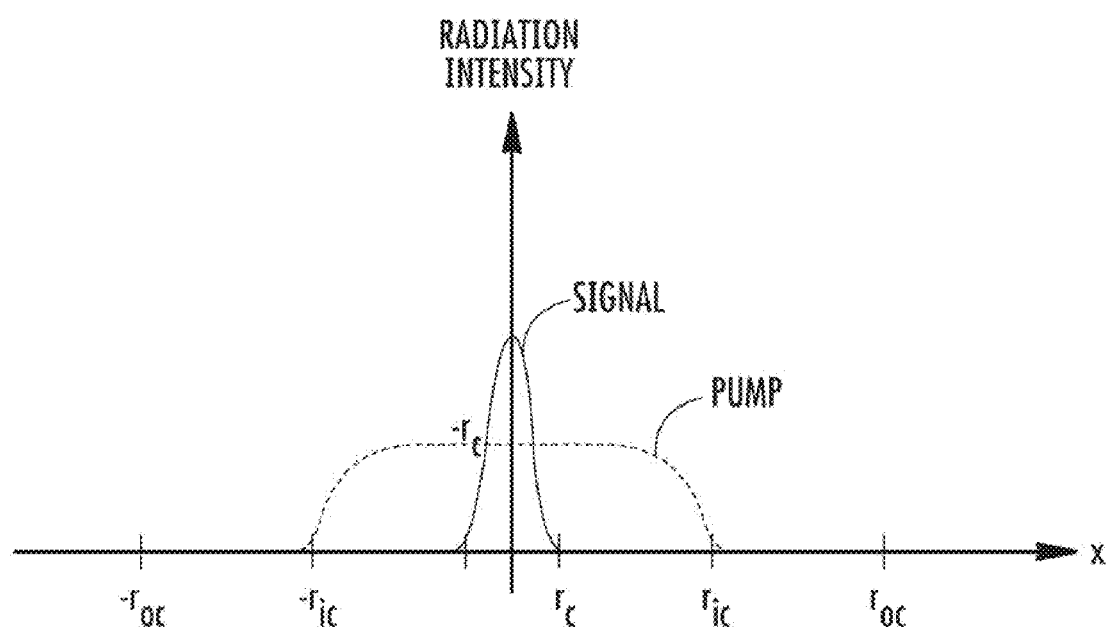
FIG. 2 is a schematic plot of the intensities of both pump and laser radiation as a function of position within the fiber of FIG. 1.

The above description can be re-casted in terms of the theory of photonic bandgap (PBG) and optical waveguides. The cladding made of periodic media (e.g., one-dimensional rings or a two-dimensional array of rods/holes), whereby the cladding possesses one or more photonic bandgaps to pump radiation having a certain range of incident angles, such that the pump radiation has a multitude of confined modes in the fiber. The confined modes may propagate along the core of the fiber without much propagation loss other than those due to pumping the gain medium. The cladding may be configured to possess no photonic bandgaps with respect to the signal or laser radiation, regardless of the incident angle. Indeed, an infinite PBG shall have no passband at all, while a finite PBG, similar to that shown in FIG. 2, can be configured to have a stopband for the higher order modes of propagation. In addition, the refractive index of the core is smaller than the effective refractive indexes in claddings to preclude index guiding. As a result, signal or laser radiation has no confined modes in the absence of pump radiation and all the modes are leaky. When the excitation radiation is present, it provides the signal or laser radiation suitable amplification, part of which is used to compensate for the propagation loss and the rest for a net increase in output energy compared to the input. The fiber can be configured to provide a gain that is sufficient to compensate for losses in the lowest order mode, but insufficient to compensate for the propagation loss of the higher order modes, and the fiber thus possesses only single confined mode.

Referring to FIGS. 15-18, therein is shown a fiber 202 configured in accordance with another example embodiment. The fiber 202 may include a cladding 210 having various layers 212 that surround a core 208 (a fiber with this geometry is sometimes referred to as a "Bragg fiber"). The layers 212 can be solid and/or hollow (and possibly filled with fluid). Descriptions of Bragg fibers having hollow layers are provided by G. Vienne et al., "Ultra-large bandwidth hollow-core guiding in all-silica Bragg fibers with nano-supports," Optics Express, Vol. 12(15), pp. 3500-3508 (2004), while descriptions of Bragg fibers having solid layers are provided by Hart, S. D., et al., "External reflection from omnidirectional dielectric mirror fibers." *Science* Vol. 296(5567), 2002, pp. 510-513, both of which are incorporated herein by reference in their entireties.

The core 208 may be a hollow defined by the fiber 202, for example, by the radially innermost layer 212 of the cladding 210. A fluid 214 may be disposed in the hollow core 208 so as to act as the gain medium. The fluid 214 could be a gas that is capable of acting as the gain medium; examples of such gases include, for example, various alkali atom vapors, such as lithium, sodium, potassium, rubidium, and/or cesium, when dispersed in appropriate buffer gases, such as helium, as described further in U.S. Pat. No. 7,286,575 to Payne et al., which is incorporated herein by reference in its entirety. The fluid 214 can also be a solvent containing suspended dyes or doped nanoparticles that are capable of acting as the gain medium. Examples of such particles include, but are not limited to, $Nd_2O_3$ and/or $NdF_3$, and are described further in U.S. Patent Application Publication No. 2007/0189351 to Rice et al., which is incorporated herein by reference in its entirety. In other embodiments, the core 208 may be a solid core that includes appropriate dopants to act as the gain medium.

Figure 19:
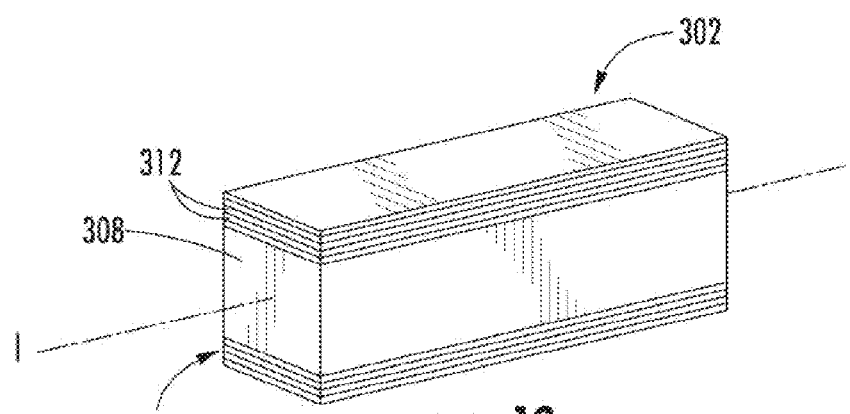
FIG. 19 is a perspective view of a fiber configured in accordance with yet another example embodiment.

Referring to FIG. 19, therein is shown a fiber 302 configured in accordance with yet another example embodiment. The fiber 302 may again be a "Bragg fiber," with a cladding 310 including various layers 312. A generally planar core 308 may extend along a longitudinal axis l between opposing portions of cladding 310. As such, the cladding 310 may be disposed on the transverse side of the core 308 and may only partially surround the core 308. In other embodiments, the cladding 310 may completely surround the core 308.

The fibers 102, 202, 302 described above and depicted, for example, in FIGS. 4, 15, and 19, are examples of PBG fibers. A PBG fiber is a fiber that utilizes photonic bandgap effects to confine radiation propagating there along. Specifically, periodic dielectric structures of appropriate dimensions tend to affect the propagation of electromagnetic radiation by causing diffraction. This diffraction defines wavelengths of radiation (for a given set of angles of incidence of the radiation) that are either reflected or transmitted by the periodic dielectric structure. Within the photonic bandgap, modes associated with a range of frequencies and propagation constants cannot be supported. It is noted that PBG fibers are also sometimes referred to as "photonic crystal fibers" and/or "microstructured fibers." The example presented above, in which a PBG fiber includes a Bragg grating, is sometimes referred to as a "Bragg fiber."

FIGS. 24A-24D are cross-sectional representations of some microstructure and/or photonic bandgap guided-wave structures with guided modes propagating along the z direction. FIG. 24A illustrates the cross-section taken along the longitudinal direction of a slab waveguide 700 having a core 702 and a cladding 704, the cladding comprising one dimensional alternating high and low index layers 706-714—i.e., representative of a Bragg slab waveguide. FIG. 24B illustrates the cross-section taken along the longitudinal direction of a slab waveguide 700 having a core 702 and a cladding 704 comprising a two dimensional hexagonal array of empty or filled holes 716. FIG. 24C illustrates the cross section taken along the transverse direction of a photonic crystal fiber 720 having a core 722 and a cladding 724 comprising a one dimensional alternating high and low index layers 726-731— e.g., a Bragg Filter. FIG. 24D illustrates the cross-section taken along the transverse direction of a photonic crystal fiber 720 having a core 722 and a cladding 724 comprising a two dimensional hexagonal array of empty or filled holes 732.

In a photonic crystal waveguide, the periodic structure in the cladding acts as a Bragg reflector that resonantly reflects light of certain combination of wavelength and incidence angle (or mode order) to confine light inside the core.

Figure 20:
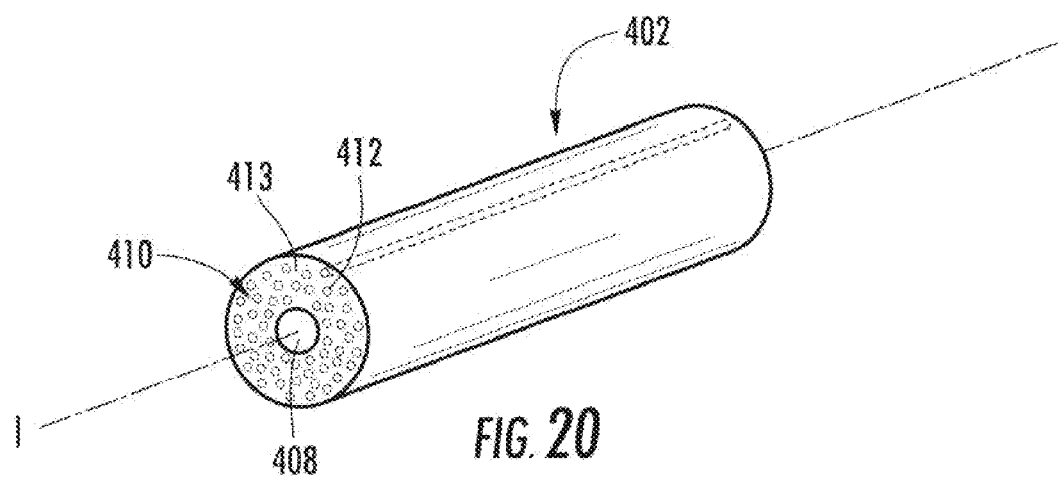
FIG. 20 is a perspective view of a fiber configured in accordance with yet another example embodiment.

In some embodiments, other types of PBG fibers may be utilized. For example, referring to FIG. 20, therein is shown a fiber 402 configured in accordance with another example embodiment. The fiber 402 may be a "holey fiber," for which a core 408 extends along a longitudinal direction l and is (at least partially) surrounded by a cladding 410 that includes an array of longitudinal holes 412. For example, the fiber 402 may be a unitary structure, with the holes 412 being formed longitudinally through the fiber and radially around the core 408. The cladding 410 then includes both the holes 412 and areas 413 between the holes where material is present. In some embodiments, the effective index of refraction $n_{cl}$ of the cladding 410 may be represented by an average of the index of refraction associated with the holes 412 (e.g., the refractive index for the material disposed within the holes, such as air, or that associated with vacuum if the holes are empty) and that of the material disposed in the areas 413 between the holes, and is higher than the refractive index of the core 408 (which core may be empty). In other embodiments of the invention, the effective index of refraction of the cladding is not equivalent to an average of the index of the refraction associated with the holes 412, but will typically be affected by the index of refraction associated with the holes as well as the size of the holes. As with earlier described embodiments, the core 408 may include a gain medium, such as gases (not shown) configured to provide laser amplification to radiation of appropriate wavelength and propagating along the core. It is noted that while the holes 412 are illustrated as being discrete and independent of one another, in some embodiments, the cladding 410 can be configured as a cellular structure, such as a honeycomb structure, that defines a periodic array of holes. An example of such a cladding is provided in G. Bouwmans et al., "Properties of a hollow-core photonic bandgap fiber at 850 nm wavelength," Optics Express, Vol. 11(14), pp. 1613-1620 (2003), which is incorporated herein by reference in its entirety.

In some embodiments, the core 408 may be (at least partially) surrounded by a cladding 410 that includes an array of longitudinal solid rods as illustrated in FIG. 24A. For example, each of the holes 412 could instead be full of solid material. The solid rods could be configured such that the effective refractive index of the rods and the material disposed among rods is higher than that of the core 408. The core 408 could be made of liquids containing suspending doped nanoparticles or solids containing doped ions or doped nanoparticles to provide amplification. In other embodiments, periodic arrays of solid structures other than cylindrical rods could be utilized as part of the cladding 410.

Figure 4:
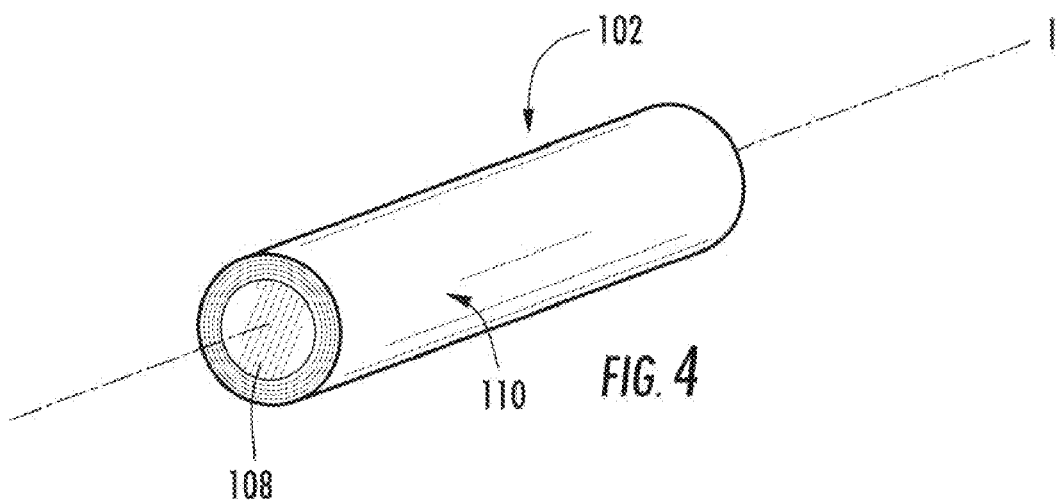
FIG. 4 is a perspective view of the fiber of the fiber laser amplifier of FIG. 3.
Figure 5A:
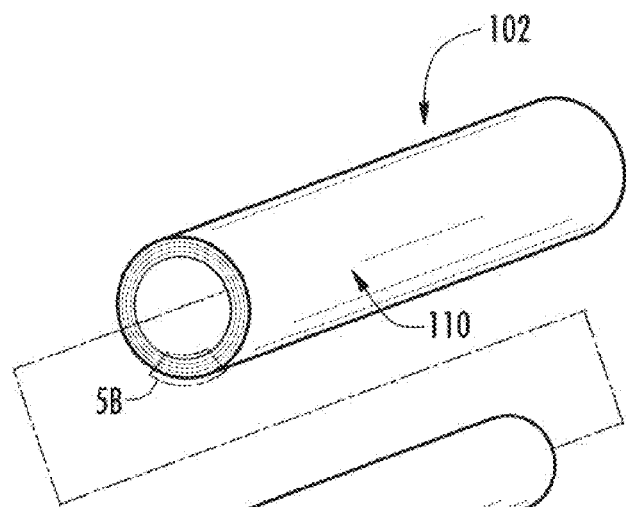
FIG. 5A is a partially exploded perspective view of the fiber of FIG. 4.
Figure 5B:
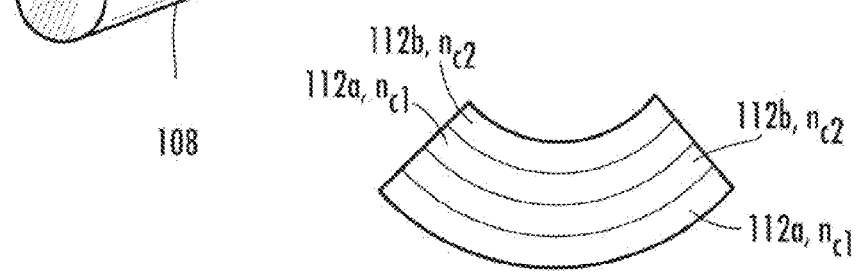
FIG. 5B is a magnified end view of the portion labeled 5B of the fiber of FIG. 5A.
Figure 6:
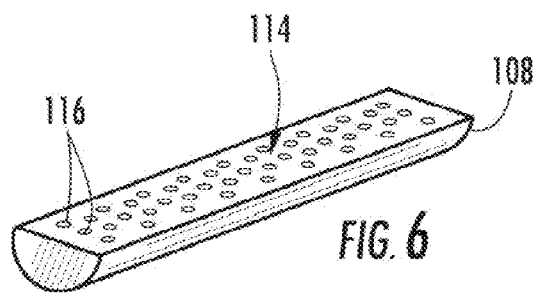
FIG. 6 is a perspective view of the fiber core of FIG. 5, wherein the fiber core is sectioned to reveal its interior.

As with the Bragg fiber of FIGS. 4 and 5A, through appropriate choice of the configuration of the holes/rods 412 and the material of the core 408 and the areas 413 around the holes, the effective index of refraction of the cladding $n_{cl}$ can be higher than that for the core $n_{co}$, thereby precluding total internal reflection for radiation propagating along the core. Further, excitation radiation of appropriate wavelength and direction that is directed into the core 408 can be resonantly reflected by the cladding 410 in much the same way as described above. Finally, the core 408 can include a gain medium, for example, in the form of dopant (for a solid core) or an appropriate fluid (for a hollow core).

Embodiments configured in accordance with the above examples may facilitate single mode, large modal area (LMA) transmission of signal or laser radiation through a fiber. Using an index-antiguiding fiber, signal or laser radiation associated with higher order modes of propagation tends to be emitted in a variety of directions, and therefore does not contribute appreciably to the output from the fiber. This may facilitate the use of larger diameter fibers, as the ability to discriminate, by embodiments of this method, between the lowest order mode of propagation and higher order propagation modes does not depend exclusively on the diameter of the fiber core (as in many prior devices), but is a function of the gain as well. Additionally, by using a microstructured fiber, such as a PBG fiber, for pump transmission, excitation radiation can be propagated through the fiber, despite its index-antiguiding nature, the excitation radiation inducing the continuous amplification of the lowest order mode of propagation of the signal or laser radiation as it advances along the fiber core.

The bandwidth of the photonic bandgap for a given cladding affects the number of confined modes of the excitation radiation. It is known from conventional double-cladding fibers that as the number of pump modes confined in the inner cladding increases, it becomes easier to couple excitation radiation into the inner cladding, thereby improving the overall pumping efficiency. Embodiments provided herein may support many confined modes for the excitation radiation by employing fibers/waveguides incorporating cladding having a large photonic bandgap. For example, some embodiments may utilize PBG fibers with complete photonic bandgaps that contain excitation radiation from all incident angles. An example of such a PBG fiber is the BeamPath™ fibers available from OmniGuide Inc. of Cambridge, Mass. Further discussion of PBG fibers is provided in B. Temelkuran et al., "Wavelength-scalable hollow optical fibres with large photonic bandgaps for CO2 laser transmission," Nature, Vol. 420, pp. 650-653 (2002), which is incorporated herein by reference in its entirety.

Referring to FIGS. 21A-D, therein is schematically represented a method for producing a planar waveguide configured in accordance with an example embodiment. A substrate 540*a* of commercially available phosphate glass, such as active IOG1 glass, can serve as the base material. IOG1 glass is a doped phosphate glass that includes a uniformly high concentration of, for example, $Er^{3+}$ (for example, in order to produce a final dopant density of approximately $10^{21}$ cm$^{-3}$) and $Yb^{3+}$ (for example, in order to produce a final dopant density of approximately $10^{20}$ cm$^{-3}$). The substrate 540*a* can be uniformly doped with $Na^+$ and/or $K^+$ ions, for example, via an ion exchange process, thereby creating a doped region 541*a*. A mask 542*a* can then be disposed over the substrate 540*a* before doping the substrate (in the unmasked areas 544) with $Ag^+$. The suitability of IOG1 glass for such applications is discussed further in S. Blaize et. al., IEEE Photon. Technol. Lett., Vol. 15, p. 516 (2003), which is incorporated herein by reference in its entirety. This process results in a PBG fiber 502*a* having a core 508*a*, and a surface grating 510*a*.

Ion exchange can produce index differences from 0 to 0.008 for potassium-doped or 0 to 0.015 for silver-doped materials. Ion exchange leads to a graded index profile that is highest on the surface and is gradually reduced towards the substrate until a depth of 5-8 μm. The index profile can be adjusted by controlling the concentration of the salts, the oven temperature during the ion exchange (between 300-500° C.), and exposure time of substrate in the salt bath. The resulting surface single mode waveguides can be expected to exhibit losses of ~1 dB/cm (K-doped) and ~1.2-1.5 dB/cm for Ag-doped. To reduce the propagation loss, an additional field-assisted ion diffusion process can be performed by applying a voltage of approximately 100 V/cm across the substrate 540, which can result in an embedded waveguide.

Referring to FIGS. 22A-C, therein is schematically represented another method for producing a gain-guided Bragg fiber configured in accordance with an example embodiment.

A substrate 540*b* of commercially available phosphate glass is patterned via reactive ion etching through a mask 542*b* to form a surface grating 510*b*. The surface region 541*b* of the substrate 540*b* can be co-doped, via ion exchange, with high concentration of, for example, $Na^+/K^+$ ions and $Ag^+$ ions. This process results in a PBG fiber 502*b* having a core 508*b*, and a surface grating 510*b*.

An embodiment of a gain-guided microstructured fiber is shown in FIG. 24D. Photonic-crystal fibers with a two-dimensional array of holes or rods are known to possess the largest form birefringence of all fibers. Placing air holes or high-index rods at a location that breaks the azimuthal symmetry of the fibers will introduce significant structural anisotropy, as discussed in A. Ortigosa-Blanch et. al., "Highly birefringent photonic crystal fibers," Opt. Lett., Vol. 25, pp. 1325-1327 (2000), which is incorporated herein by reference in its entirety. Alternatively, stress may be induced in LMA-single mode photonic crystal fibers using stress-applying parts, as discussed in J. R. Folkenberg, et. al., "Polarization maintaining large mode area photonic crystal fiber," Optics Express, Vol. 12, pp. 956-960 (2004), which is incorporated herein by reference in its entirety. In one embodiment of the invention, a PBG fiber may be configured to possess large birefringent with a rotationally symmetric core with uniform doping, as illustrated in FIG. 24E. The fiber is configured to have polarization dependent photonic bandgap such that the propagation loss of the fundamental mode along the x direction is larger than that along the y direction. If a gain is provided such that it compensates at least for the loss along the y direction and cannot compensate for the loss along the x direction, the gain guided mode will only be enabled along the y direction to deliver polarization-maintained output in the said direction.

In another embodiment of the invention, a PBG fiber has very small or negligible birefringent with a rotationally asymmetric core with uniform doping within the said core, as illustrated in FIG. 24F. The fiber is configured to have a very small or a negligible difference in propagation losses at signal radiation for modes with polarization along the orthogonal directions in the absence of the excitation radiation, and a higher gain for the modes with polarization along the y direction. If proper strength of excitation radiation is provided such that the gain along the y direction can at least compensate for the propagation loss of the fundamental mode in the y direction, while the gain along the x direction cannot compensate for the propagation loss of the fundamental mode in x direction, the gain guided mode will only be enabled along the y direction to deliver polarization-maintained output in the said direction. For both cases, gain guiding may be used to select the preferred polarization.

The gain-guided microstructured waveguides of the current invention may have relatively high conversion efficiency and therefore facilitate a reduced device length. Since pump radiation will be rejected by the photonic bandgap cladding, it is preferred to focus the pump radiation to a spot size comparable to that of the spatial dimensions of the core at the entrance of the waveguide. This is within the capability of modern fiber-coupled laser diodes, which can deliver several hundreds of watts in a multimode fiber with a core diameter between 400 μm and 800 μm, which can be imaged optically to the core of the microstructured waveguide with appropriate beam shaping. In general, the pump radiation shall be reshaped to have an incoming angle that matches the numerical aperture of the waveguide and a spot size comparable to the spatial dimension of the core of the waveguide. Doing so increases the spatial overlap between pump and signal and therefore the filling factor, which enables more efficient energy transfer therein. High conversion efficiency helps reduce the required device length which further increases the nonlinear threshold.

Also, while many of the above described embodiments have focused on fiber laser amplifier applications, the concepts embodied therein may also be applicable to laser oscillation applications by placing the fibers inside an optical cavity, usually defined between two mirrors. For example, referring to FIG. 23, therein is shown a fiber laser oscillator 600 (or simply "fiber laser") configured in accordance with an example embodiment. The fiber laser oscillator 600 includes a fiber 602 having a gain medium-containing core 608 and a cladding 610, as discussed above. An excitation radiation source 606 can be configured so as to emit excitation radiation $R_e$ and, optionally, a signal or laser radiation source (not shown) may emit signal or laser radiation $R_s$. For example, in many laser oscillators, oscillation is initiated by spontaneous emission and not necessarily by seeding. However, in certain other embodiments, a signal or laser radiation source may be used to seed the laser oscillator.

A pump mirror 650 can be disposed along a longitudinal axis l defined by the core 608. The pump mirror 650 can be configured to be significantly transmissive to excitation radiation $R_e$ while being significantly reflective of signal or laser radiation $R_s$. An output coupler 652 can be disposed along the longitudinal axis l and in opposition to the pump mirror 650. The output coupler 652 can be configured to be partially reflective of signal or laser radiation $R_s$, such that signal or laser radiation encountering the output coupler is partially reflected and partially transmitted by the coupler.

As the excitation radiation source 606 emit excitation radiation $R_e$, the radiation is transmitted by the pump mirror 650 and propagates along the core 608, thereby activating the gain medium contained therein. When signal or laser radiation $R_s$ is applied, it also propagates along the core 608 and becomes amplified by the gain medium. The amplified signal or laser radiation $R_s$ is partially reflected and partially transmitted by the output coupler 652. The reflected portion of the signal or laser radiation $R_s$ propagates in the opposite direction along the core 608 until it encounters the pump mirror 650. The signal or laser radiation $R_s$ is reflected by the pump mirror 650 in a direction back along the core 608. As the signal or laser radiation $R_s$ propagates back and forth along the core, it is further amplified by the gain medium. Stable oscillations of the fiber laser oscillator 600 are established when the amplification of the signal or laser radiation $R_s$ for each round trip through the fiber 602 is sufficient to compensate for the energy loss associated with the round trip, including the loss being related to the partial transmission of signal or laser radiation by the output coupler 652 and the diffraction loss associated with index antiguiding.

Many modifications and other embodiments of the inventions set forth herein will come to mind to one skilled in the art to which these inventions pertain having the benefit of the teachings presented in the foregoing descriptions and the associated drawings. For example, while many of the above described embodiments included reference to a "fiber," it should be understood that the term "fiber," as used herein, can refer to any elongated structure capable of at least partially facilitating the propagation of radiation there along, optical fibers being but one example. As such, the term "fiber" is often interchangeable with the term "waveguide," and it should be understood that linear or planar waveguides can be utilized in most applications.

The concepts disclosed herein embodied within the invention have wide applicability since, having the benefit of this disclosure, they can be implemented in many types of microstructured and/or photonic bandgap waveguides and fibers. FIGS. 24A-24D are cross-sectional representations of some photonic bandgap guided-wave structures with guided modes propagating along the z direction. Many of these structures have previously been described herein. FIG. 24A illustrates the cross-section taken along the longitudinal direction of a slab waveguide 700 having a core 702 and a cladding 704, the cladding comprising one dimensional alternating high and low index layers 706-714—i.e., representative of a Bragg slab waveguide. While this exemplary embodiment shows nine layers alternating, the number of layers may be chosen in consideration of the selection for properties for those layers to achieve the desired propagating effects for the waveguide.

FIG. 24B illustrates the cross-section taken along the longitudinal direction of a slab waveguide 700 having a core 702 and a cladding 704 comprising a two dimensional hexagonal array of empty or filled holes 716. As can be determined from FIGS. 24A and 24B, it is noted that, for a slab waveguide, the opposing dimension is usually confined by index guiding or purely only by gain guiding.

FIG. 24C illustrates the cross section taken along the transverse direction of a photonic crystal fiber 720 having a core 722 and a cladding 724 comprising a one dimensional alternating high and low index layers 726-731—e.g., a Bragg Filter. While this exemplary embodiment shows six alternating layers, the number of layers may be chosen in consideration of the selection for properties for those layers to achieve the desired propagating effects for the waveguide.

FIG. 24D illustrates the cross-section taken along the transverse direction of a photonic crystal fiber 720 having a core 722 and a cladding 724 comprising a two dimensional hexagonal array of empty or filled holes 732.

According to one embodiment of the invention, the microstructured cladding is configured to provide a periodic structural modulation of refractive index and/or physical dimension. In another embodiment of the invention, the microstructured cladding is configured to provide an aperiodic structural modulation of refractive index and/or physical dimension. Pursuant to these embodiments of the invention, the microstructured cladding acts as a reflector that resonantly reflects a light that is defined by a certain combination of wavelength and incidence angle (or mode order) to confine the light inside the core. The graph in FIG. 25A represents the reflectivity in a photonic crystal cladding versus changing wavelength 734. For a given mode order (or an incident angle), the reflectivity of the photonic crystal cladding is usually periodic in wavelength, as shown in FIG. 25A, with high and low reflectivity referred as "stopband" 736 and "passband" 738, respectively. In accordance with an embodiment of the present invention, the photonic crystal cladding 724 is selected such that the stopband of the cladding 724 resonates with pump radiation 740 allowing the pump radiation 740 to be confined in the core 722 via Bragg resonance as illustrated in FIG. 25B.

The lower-order modes of laser radiation, on the other hand, are selected to reside in the passband 738 of the cladding 724. The passband 738 may also be selected to include those regions of the reflectivity versus wavelength curve where reflectivity is not substantially close to zero such as the border region between the high transmission and high reflection regions of the curve. I.e., a reflectivity is not substantially close to zero where the point on the sloped region still demonstrates sufficient loss such that gain guiding is enabled. When suitable gain is supplied in the core 722, through selection of an appropriate gain medium, laser radiation can become gain guided with single mode and large mode area.

The microstructured and/or photonic crystal cladding can be configured in many ways such that the lower-order modes of laser wavelength reside in the passband. In one embodiment of the invention, the high-index layer in the photonic crystal cladding is configured to impose a π phase shift (so called "half-wave condition" or "absentee-layer condition") at the laser radiation such that the high-index layer has no effect on the propagation characteristics of the said modes. In another embodiment of the invention, the high-index layer in the photonic crystal cladding is configured to impose a condition other than the half-wave condition at the laser wavelength.

In one embodiment of the invention, the microstructured cladding has infinite pairs of structural modulation of refractive index and/or physical dimension. In another embodiment of the invention, the microstructured cladding has finite pairs of structural modulation of the said parameters, followed by an outer cladding, as illustrated in FIG. 30. The number of pairs of structural modulation shall be chosen to reasonably confine the pump radiation within the core such that the propagation along the fiber has low loss. The outer cladding may comprise a homogeneous material whose refractive index is chosen to facilitate gain guiding of the fundamental mode at laser radiation in a otherwise lossy fiber while at the same time maintain a good confinement of pump radiation in the core.

Although the present invention can be implemented in any configurations in FIGS. 24A-24F or any other type of photonic crystal waveguides and fibers, it suffices to demonstrate it in embodiments involving a Bragg slab waveguide and a Bragg fiber, which is shown in FIGS. 24A & 24C, respectively. These illustrative embodiments fully demonstrate the physics of the full three dimensional structures, while at the same time substantially reducing computational requirements.

EXAMPLES

Example 1

A Bragg slab waveguide as shown in FIG. 24A was considered having the following set of parameters:
(1) Slab core width=50 µM and refractive index $n_0$=1.567;
(2) Pump wavelength $\lambda_p$=0.803 µm and laser wavelength $\lambda_s$=1.055 µm; and
(3) The Bragg layer had a high index layer with index $n_1$=2.2 and thickness $d_1$=0.34 µm, and a low-index layer with $n_2$=1.57 and $d_2$=0.575 µm.

FIG. 26 shows the photonic bandstructure of this exemplary Bragg layer with infinite pairs for TE polarization. The horizontal line 742 represents the refractive index of the core material, below which propagating modes in the core could exist. The vertical lines represent the pump wavelength 744 and the laser wavelength 746. As shown, the lower-order modes at laser wavelength lies in the passband regions 748 and many guided modes at pump wavelength are supported in the stopband 750.

In this exemplary embodiment, the unsaturated gain coefficient $g_0$ was considered to be uniform across the core. $g_0$ is related to the imaginary part of the complex refractive index by $n''=g_0/2k_0$ where $k_0$ is the vacuum wavenumber. FIGS. 27A-27D compares the amplitudes of the fundamental mode of laser radiation at varying gains. As shown in FIG. 27A, the passive waveguide (i.e., without gain or $n''$=0) was shown to have a leaky fundamental mode, as indicated by its diverging amplitude in the cladding and a negative imaginary part of its effective refractive index $n''$=−7.6149×10$^{-6}$.

FIG. 27B shows the case when a material gain of $n''$=7.6149×10$^{-6}$ exists in the core. The mode assumed a flat amplitude in the cladding and resulted in the imaginary part of its effective refractive index $n''$ to assume a value that is substantially zero (i.e., less than about 1×10$^{-9}$).

FIG. 27C shows the case when the core was configured to have a material gain $n''$=1.5×10$^{-5}$ (about twice that of the passive loss). The mode became confined with a decaying amplitude in the cladding and a positive imaginary part of its effective refractive index $n''$=7.44373E-6.

FIG. 27D shows the case when the core was configured to have a material gain $n''$=6×10$^{-5}$ (about eight times of the passive loss). The mode decayed much faster with the imaginary part of it effective refractive index $n''$=5.26256×10$^{-5}$. Such a gain-dependent modal confinement is representative of gain guided modes where the modal shape in the cladding changes as a function of the gain.

FIG. 26 shows that pump radiation has many guided modes with an effective modal index between 1.567 and 1.46. FIGS. 28A-28D shows the modal profiles of several representative guided modes of pump radiation for this exemplary embodiment. The modal profiles in these figures show that as mode order increased, the number of amplitude oscillations also increased. In all the modes represented by the graphs of FIGS. 28A-28D, a very good modal confinement is observed due to the fast decaying amplitude in the Bragg cladding.

The small stopband 752 located near $n_{eff}$~1.4 at the laser wavelength in FIG. 26 will not diminish the robustness of single-transverse-mode operation during the gain guiding, since these higher-order modes extend much further into the cladding and therefore possess higher loss in a Bragg cladding with finite Bragg pairs, which, in practice, is the configuration for the Bragg cladding. This was confirmed by examining the reflectance of a Bragg mirror having six Bragg pairs. As shown in FIG. 29, laser radiation 764 has a much lower reflectance (~90%) near $n_{eff}$=1.4 than at glancing incidence (>99%). FIG. 29 also shows the reflectivity for guided modes with effective indices between 1.567 and 1.46 for pump radiation 762 near unity. Such an efficient reflection with only six Bragg pairs is made possible as a result of the large index of contrast used in this exemplary embodiment.

Example 2

As disclosed in X. Ao, et al. "Gain guiding in large-core Bragg fibers," Optical Express Vol. 17, 2009, pp. 22666-22672, included herein by reference in its entirety, a Bragg fiber as shown in FIG. 30 was considered having the following set of parameters:
(1) Fiber core width=100 µm and refractive index $n_0$=1.56;
(2) Pump wavelength $\lambda_p$=0.803 µm and laser wavelength $\lambda_s$=1.055 µm; and
(3) An inner cladding comprised of a Bragg layer having a high index layer with index $n_1$=2.2 and thickness $d_1$=0.34 µm, and a low-index layer with $n_2$=1.57 and $d_2$=0.575 µm; and
(4) An outer cladding comprised of a uniform layer with index $n_1$=1.56 and sufficiently thick such that its outer boundary had no significant effect on the propagation characteristics of modes in the core.

For a step-index fiber with index contrast less than 2.02, the lowest order mode is hybrid $HE_{11}$ mode containing both TE and TM polarizations. In an embodiment of the invention, TE and TM PBG need to be considered simultaneously when selecting parameters for the Bragg fiber. Using the Bragg layer as described in Example 1, FIG. 31 shows the composite TE and TM band diagram of an infinite Bragg cladding. The band diagram shows a band for TE polarization 754, bands for TM polarization 756, bands for both TE polarization and TM polarization 758, and stopband regions 760. In this exemplary embodiment, the core of the Bragg fiber had a width of 100 μm and an index of 1.56. At the laser or signal wavelength 746, the light line 742 of the core is located inside the passing zones for both TE and TM polarizations 758, indicating the low-order modes are lossy in a passive fiber. At the pump wavelength 744, there is a complete bandgap 750 covering the range of $1.50 < n_{eff} < 1.56$, which implies a quite large numerical aperture for the pump—NA $\approx 1.56 \times \sin(\cos^{-1}(1.50/1.56)) = 0.42$, which is comparable to that of air-clad double-cladding fibers.

The high-index layer of a Bragg layer in this exemplary embodiment meets the so called "absentee-layer condition" for the low-order modes of laser radiation, i.e., the phase change across this layer for signal or laser radiation at glancing incident angle is π or half wave. The thickness of the an absentee layer can be determined according to $$d_1 = \lambda_s / 2\sqrt{n_1^2 - n_0^2}. \quad (2)$$

If a layer meets the half-wave condition for a light incident at an angle, it becomes transparent to that light. Absentee layers are therefore used routinely as protection coatings on top of optics. Under the absentee-layer condition, the high-index layer in Bragg cladding becomes transparent to the laser radiation. Laser radiation then experiences a true uniform cladding with refractive index equal to $n_2$ (lower index) and is index antiguided. Analytically it can be shown that, under the absentee condition, the electric field and modal equations are identical. Quantitatively, Table 1 shows the complex effective indices of low-order modes of the Bragg fiber with six Bragg pairs for both laser and pump radiations, calculated by a rigorous transfer matrix method based on the Bessel function expansion for both laser and pump radiations. Also shown are analytical results of effective indexes at laser radiation for the corresponding IAG fiber. As shown, the complex effective indices are nearly identical for the Bragg fiber and the corresponding IAG fiber at the signal wavelength, indicating the high-index layers indeed have no effect in the Bragg fiber. In addition, the loss of the pump is overall three orders of magnitude smaller than that of the laser in the Bragg fiber, indicting good pump confinement.

of pump radiation according to other embodiments of the invention. In one embodiment of the invention, non-uniform gain profile, similar to that taught by Siegman in the '388 patent, could be adopted for current invention.

Example 3

In another embodiment of the invention, a design of photonic crystal cladding departing from half-wave condition will work as well for the proposed invention, as long as laser radiation lies in the passband and pump radiation lies in the stopband of PBG. In one exemplary embodiment, a Bragg layer having the following set of parameters was considered:

(1) Pump wavelength $\lambda_p = 0.98$ μm and laser wavelength is $\lambda_s = 1.055$ μm, which can be realized in an ytterbium-doped YAG crystal with a refractive index of 1.82 near 1 um.; and (2) The Bragg layer comprised a high index layer with index $n_1 = 2.55$ (such as CdSe) and thickness $d_1 = 0.029$ μm. and a low-index layer with $n_2 = 1.37$ (such as MgF2) and thickness $d_2 = 0.265$ μm.

The photonic bandstructure for this exemplary Bragg slab waveguide is shown in FIG. 33 showing the core light line 742, the pump wavelength 744, and the laser wavelength 746. As show in FIG. 33, the laser radiation lies in the passband and pump radiation lies in the stopband with a fairly large bandwidth.

Example 4

In another embodiment, an absentee-layer condition of a high-index layer in combination with a non-uniform lower-index layer may achieve the proposed function. The refractive index profiles of an exemplary embodiment are shown in FIGS. 34A-34B. The high index layer has index $n_1$ and thickness $d_1$ that satisfy the absentee-layer condition to be transparent to the lower-order modes of laser radiation. The index of lower-index layer, however, gradually decreases from a value of $n_2$ to the core index $n_c$, followed by an outer cladding with an index of $n_c$. The index of high-index layer $n_1$, the thickness $d_2$ and the amount of index reduction Δn of each low-index layer can be determined by maximizing the reflectivity and bandwidth of pump radiation. The advantage of this

TABLE 1

| | IAG signal† | | Bragg signal | | Bragg pump |
|---|---|---|---|---|---|
| Mode | Effective index | Loss (cm$^{-1}$) | Effective index | Loss (cm$^{-1}$) | Loss (cm$^{-1}$) |
| HE$_{11}$ | 1.5599790935 | 9.51 × 10$^{-2}$ | 1.5599791208 | 9.50 × 10$^{-2}$ | 5.60 × 10$^{-5}$ |
| TE$_{01}$ | 1.5599469235 | 2.40 × 10$^{-1}$ | 1.5599469927 | 2.40 × 10$^{-1}$ | 1.93 × 10$^{-9}$ |
| TM$_{01}$ | 1.5599469235 | 2.43 × 10$^{-1}$ | 1.5599469921 | 2.42 × 10$^{-1}$ | 2.83 × 10$^{-4}$ |
| HE$_{21}$ | 1.5599469235 | 2.41 × 10$^{-1}$ | 1.5599469918 | 2.41 × 10$^{-1}$ | 1.42 × 10$^{-4}$ |

The overlapped radial profiles of $S_z$ of the HE$_{11}$ mode for both the IAG and Bragg fibers is shown in FIG. 32A. The inset of FIG. 32A also shows the radial phase profile of the $H_z$ field in the Bragg cladding, indicating a π-phase shift over each $n_1$ layer, which is consistent with the imposed half-wave condition. Furthermore, the modal gain coefficient of the Bragg fiber is identical to that of the IAG fiber when the material gain is present in the core, as shown in FIG. 32B. This half-wave condition therefore provides a simple and yet robust strategy to design gain-guided Bragg waveguides.

It is important to note that other configurations beyond those examples that have been shown herein exist to support gain guiding of laser radiation and simultaneous confinement design is demonstrated in FIG. 34B, where as the limit of a very small $d_2$ and Δn, the waveguide or fiber has a linearly chirped index antiguiding profile. Since higher-order modes extend further into the cladding than the fundamental mode, higher-order modes experience, on average, a smaller amount of IAG than the fundamental mode, and hence a much large loss. The loss discrimination between the fundamental mode and higher-order modes can be made larger in accordance to this current design than by that achieved based upon the teachings of Siegman. Therefore, the present invention offers more robust gain-guided single mode operation.

Based upon the disclosure provided herein, other chirp profiles are possible, such as a nonlinearly chirped profile involving quadratic or higher order. In another embodiment, partial or even all of the high index layers are made nonuniform across the cladding as long as each layer meets the absentee condition. In yet another embodiment, partial or even all of the low index layers are made nonuniform across the cladding. For example, the period of the Bragg pairs could be made to gradually increase similar to that of a chirp Bragg grating.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber comprising:
 a core extending longitudinally, the core including a gain medium having a dopant substantially distributed throughout the core, wherein the core is excited by at least one mode of excitation radiation to define at least one gain-guided mode of laser radiation in the fiber; and
 a cladding surrounding the core, the cladding is configured to provide
  a low-loss propagation of the at least one mode of excitation radiation along the core and
  a lossy propagation of all modes of laser radiation along the core that is higher than the low-loss propagation when the at least one mode of excitation radiation is substantially absent from the core.

2. The fiber according to claim 1, wherein the core is cylindrical and the cladding is radially exterior to the core.

3. The fiber according to claim 1, wherein the core is planar and the cladding is disposed on opposing transverse sides of the core.

4. The fiber according to claim 1, wherein:
 the cladding is configured to provide a reduced propagation loss for a lowest-order mode of laser radiation propagating along the core relative to a propagation loss for one or more high-order modes of laser radiation propagating along the core; and
 the gain medium is configured to
  amplify the lowest-order mode of laser radiation to at least compensate for the reduced propagation loss, and
  be insufficient to compensate for the propagation loss of the one or more higher-order modes of laser radiation.

5. The fiber according to claim 1, wherein the cladding is configured to substantially confine within the core a plurality of modes of excitation radiation.

6. The fiber according to claim 1, the cladding having a photonic bandgap region configured to have at least one stopband and at least one passband.

7. The fiber according to claim 6, wherein the at least one stopband prevents the at least one mode of excitation radiation from substantially passing through the photonic bandgap region and the at least one passband allows the all modes of laser radiation to substantially pass through the photonic bandgap region.

8. The fiber according to claim 6, wherein the photonic bandgap region comprises any one of a plurality of holes disposed longitudinally through and substantially distributed throughout the photonic bandgap region, a plurality of longitudinally extending rods, and at least one layered pair, wherein a refractive index of a first layer of the at least one layered pair is different from a refractive index of a second layer of the at least one layered pair.

9. An apparatus comprising
 a fiber having
  a core extending longitudinally, the core including a gain medium having a dopant substantially distributed throughout the core, wherein the core is excited by at least one mode of excitation radiation to define at least one gain-guided mode of laser radiation in the fiber; and
  a cladding surrounding the core, the cladding is configured to provide
   a low-loss propagation of the at least one mode of excitation radiation along the core and
   a lossy propagation of all modes of laser radiation along the core that is higher than the low-loss propagation when the at least one mode of excitation radiation is substantially absent from the core; and
 an excitation radiation source configured to emit a light, the light coupled to the at least one mode of excitation radiation absorbed by the gain medium when propagating through to the core.

10. The apparatus according to claim 9, additionally comprising a laser radiation source coupled to the core and configured to emit a laser radiation that is generally transmitted through at least the core.

11. The apparatus according to claim 9, wherein the core is cylindrical and the cladding is radially exterior to the core.

12. The apparatus according to claim 9, wherein the core is planar and the cladding is disposed on opposing transverse sides of the core.

13. The apparatus according to claim 9, wherein
 the cladding is configured to provide a reduced propagation loss for a lowest-order mode of laser radiation propagating along the core relative to a propagation loss for one or more high-order modes of laser radiation propagating along the core; and
 the gain medium is configured to
  amplify the lowest-order mode of laser radiation to at least compensate for the reduced propagation loss, and
  be insufficient to compensate for the propagation loss of the one or more higher-order modes of laser radiation.

14. The apparatus according to claim 9, wherein the cladding is configured to confine within the core a plurality of modes of excitation radiation.

15. The apparatus according to claim 9, the cladding having a photonic bandgap region configured to have at least one stopband and at least one passband.

16. The apparatus according to claim 15, wherein the at least one stopband prevents the at least one mode of excitation radiation from substantially passing through the photonic bandgap region and the at least one passband allows the all modes of laser radiation to substantially pass through the photonic bandgap region.

17. The apparatus according to claim 15, wherein the photonic bandgap region comprises one of a plurality of holes disposed longitudinally through and substantially distributed throughout the photonic bandgap region, a plurality of longitudinally extending rods, and more than one layer, wherein a refractive index of any layer of the more than one layer is different from a refractive index of a layer of the more than one layer that is adjacent to the any layer.

18. The apparatus according to claim 9, further comprising:
 a pump mirror disposed along a longitudinal axis defined by the core and configured to be significantly transmissive to the excitation radiation and significantly reflective of the laser radiation; and an output coupler disposed along the longitudinal axis defined by the core and in opposition to the pump mirror, the output coupler configured to be partially reflective of the laser radiation.

19. A method comprising:

providing a fiber having a core extending longitudinally, the core including a gain medium having a dopant substantially distributed throughout the core, wherein the core is excited by at least one mode of excitation radiation to define at least one gain-guided mode of laser radiation in the fiber; and a cladding surrounding the core, the cladding is configured to provide a low-loss propagation of the at least one mode of excitation radiation along the core and a lossy propagation of all modes of laser radiation along the core that is higher than the low-loss propagation when the at least one mode of excitation radiation is substantially absent from the core; and coupling the at least one mode of excitation radiation into the core, the at least one mode of excitation radiation absorbed by the gain medium when propagating through the core.

20. The method according to claim 19, additionally comprising coupling a laser radiation into the core, the laser radiation is generally transmitted through at least the core.

21. The method according to claim 19, additionally comprising producing laser oscillation with at least one mirror.

* * * * *